J. F. WEBB, Jr.
TRAIN SIGNALING AND CONTROLLING SYSTEM.
APPLICATION FILED JUNE 8, 1908.

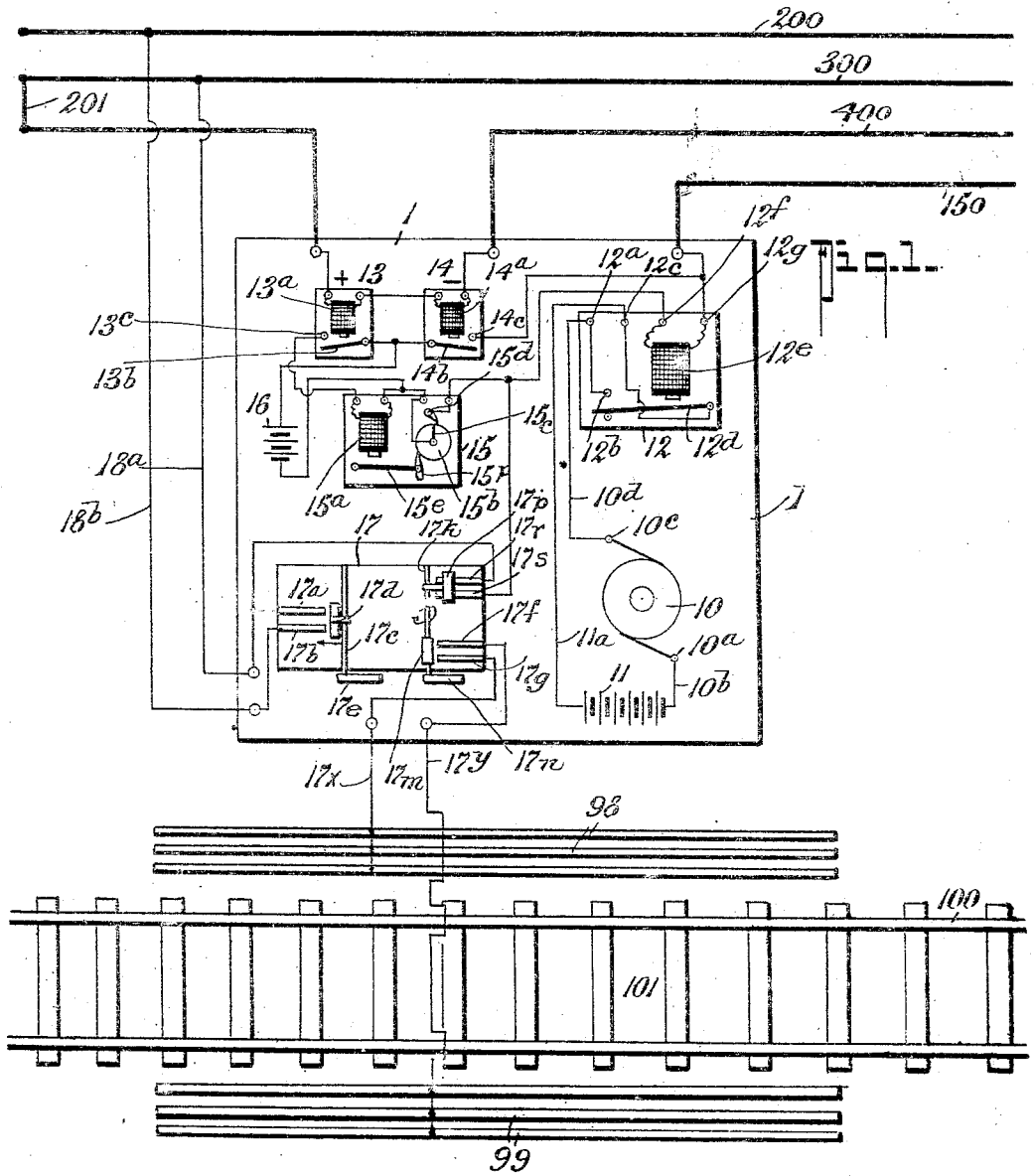

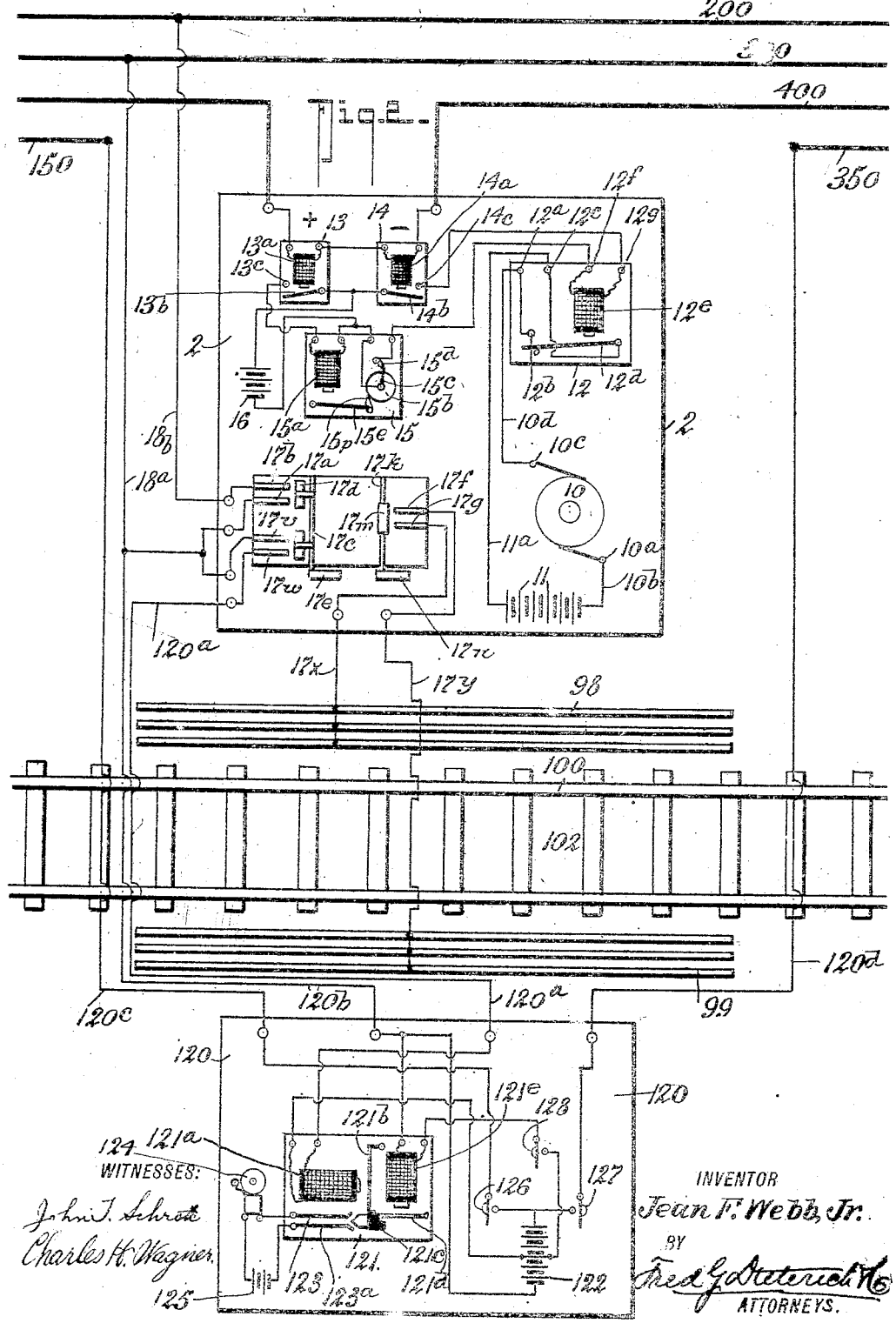

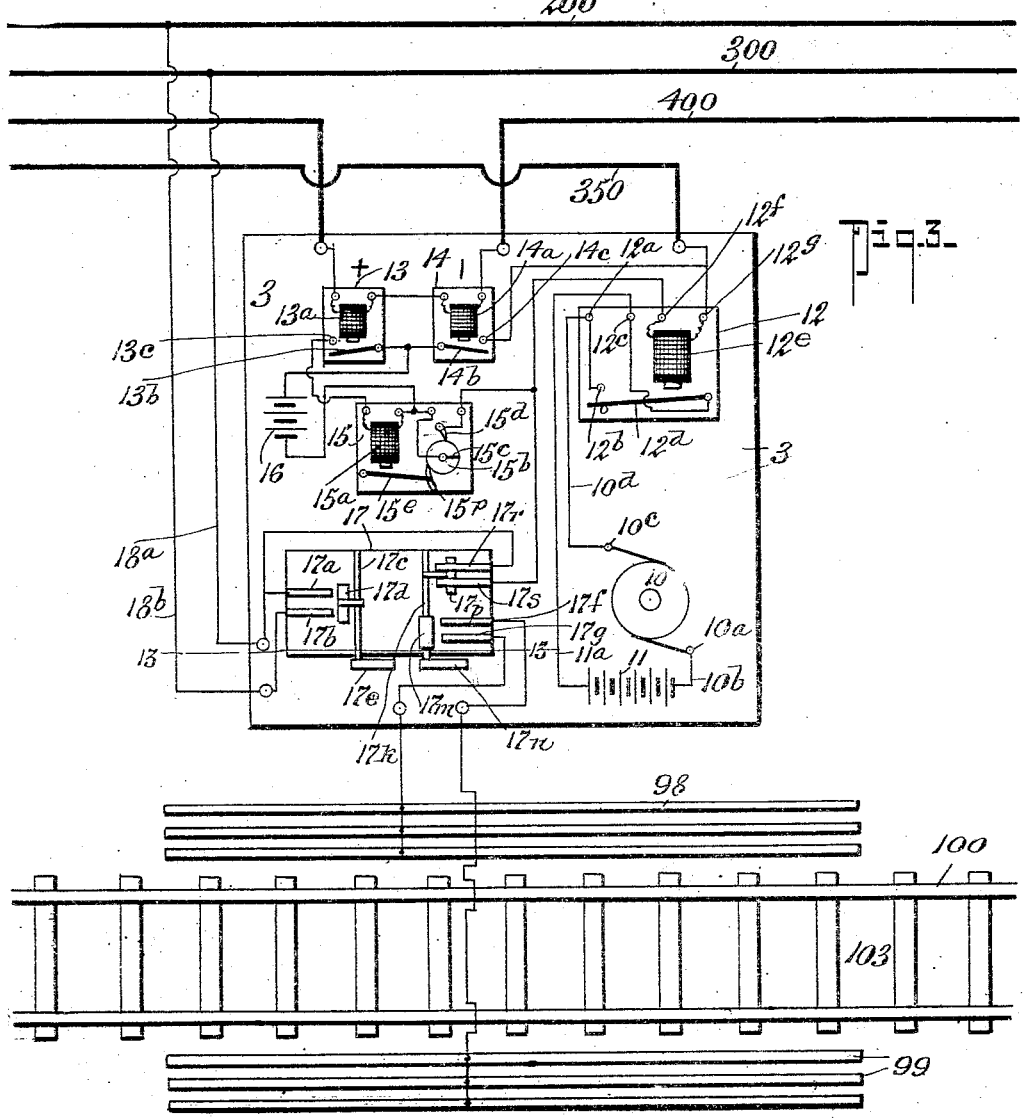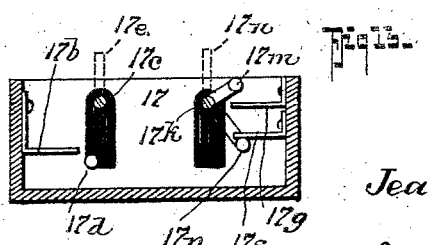

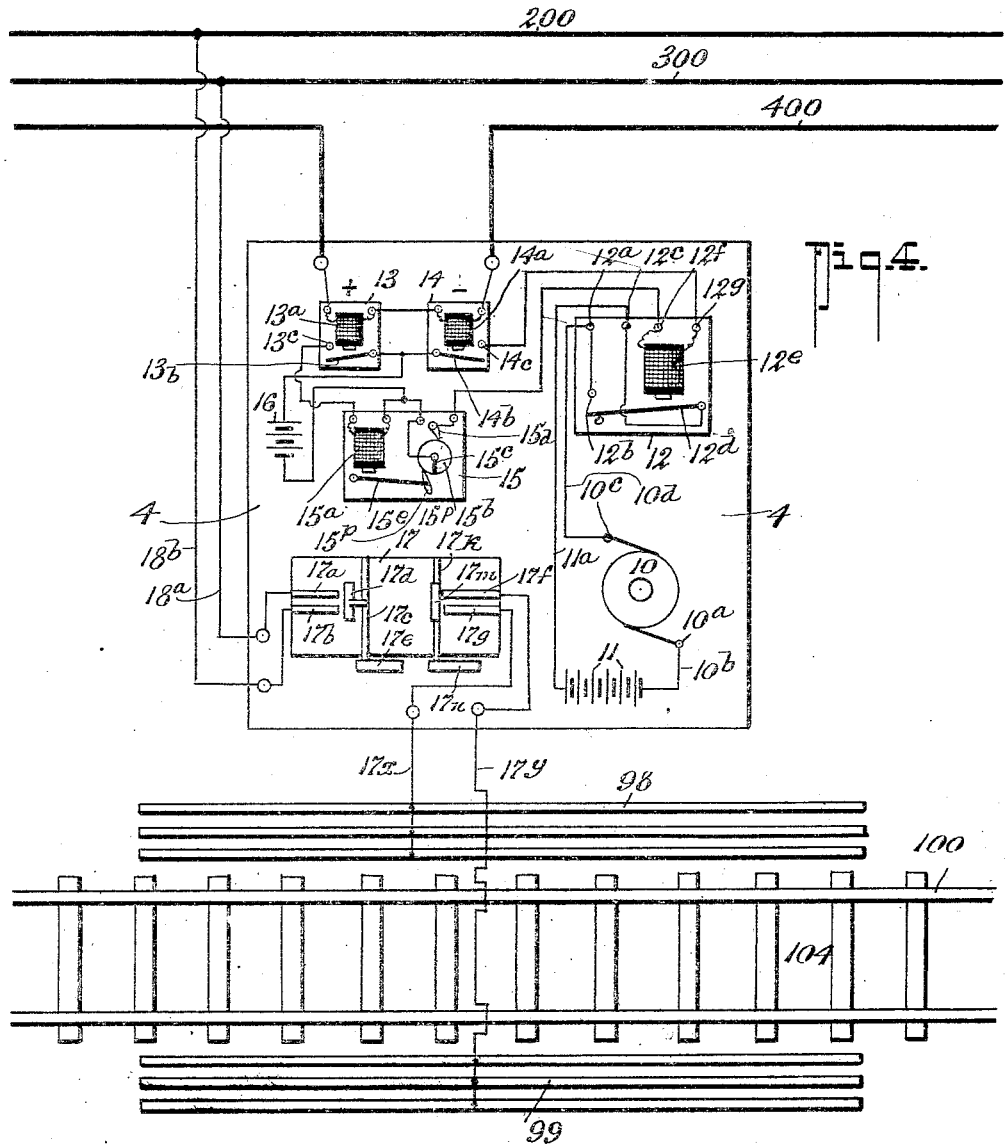

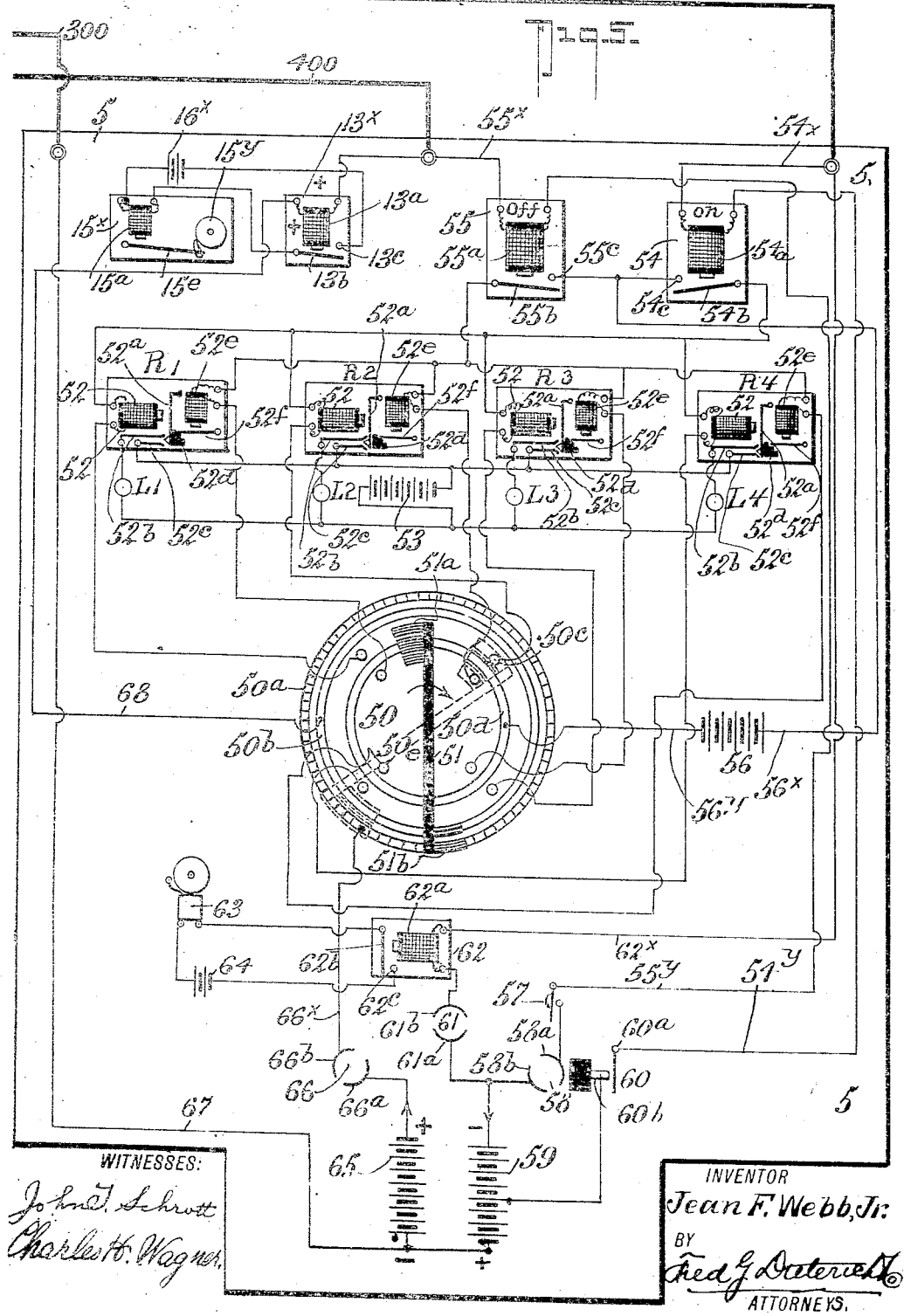

1,114,078.

Patented Oct. 20, 1914.
8 SHEETS—SHEET 6.

WITNESSES:
John T. Schrott
Charles H. Wagner

INVENTOR
Jean F. Webb, Jr.
BY
Fred G. Dieterich
ATTORNEYS.

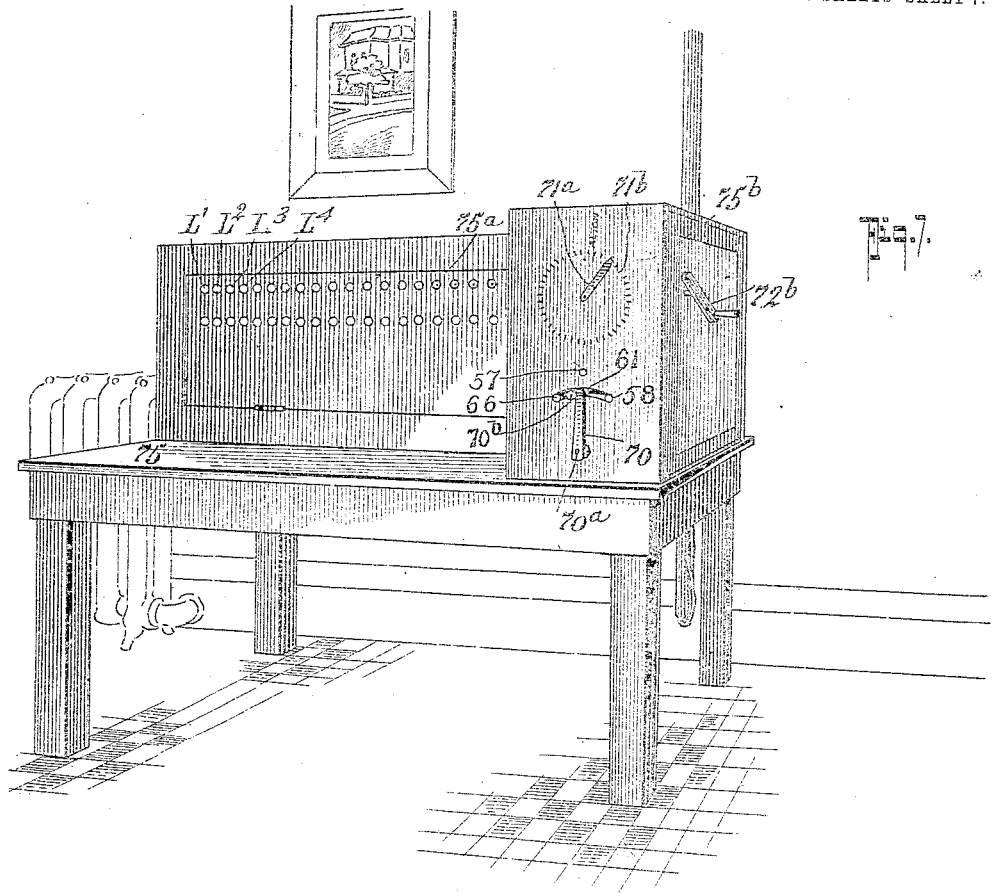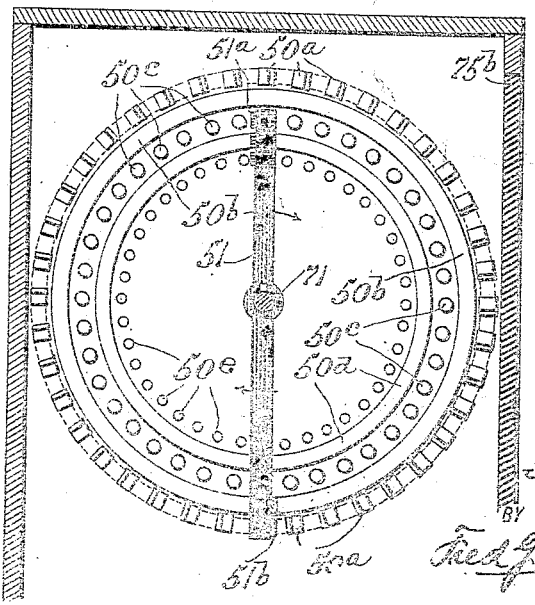

J. F. WEBB, Jr.
TRAIN SIGNALING AND CONTROLLING SYSTEM.
APPLICATION FILED JUNE 8, 1908.
1,114,078.
Patented Oct. 20, 1914.
8 SHEETS—SHEET 8.
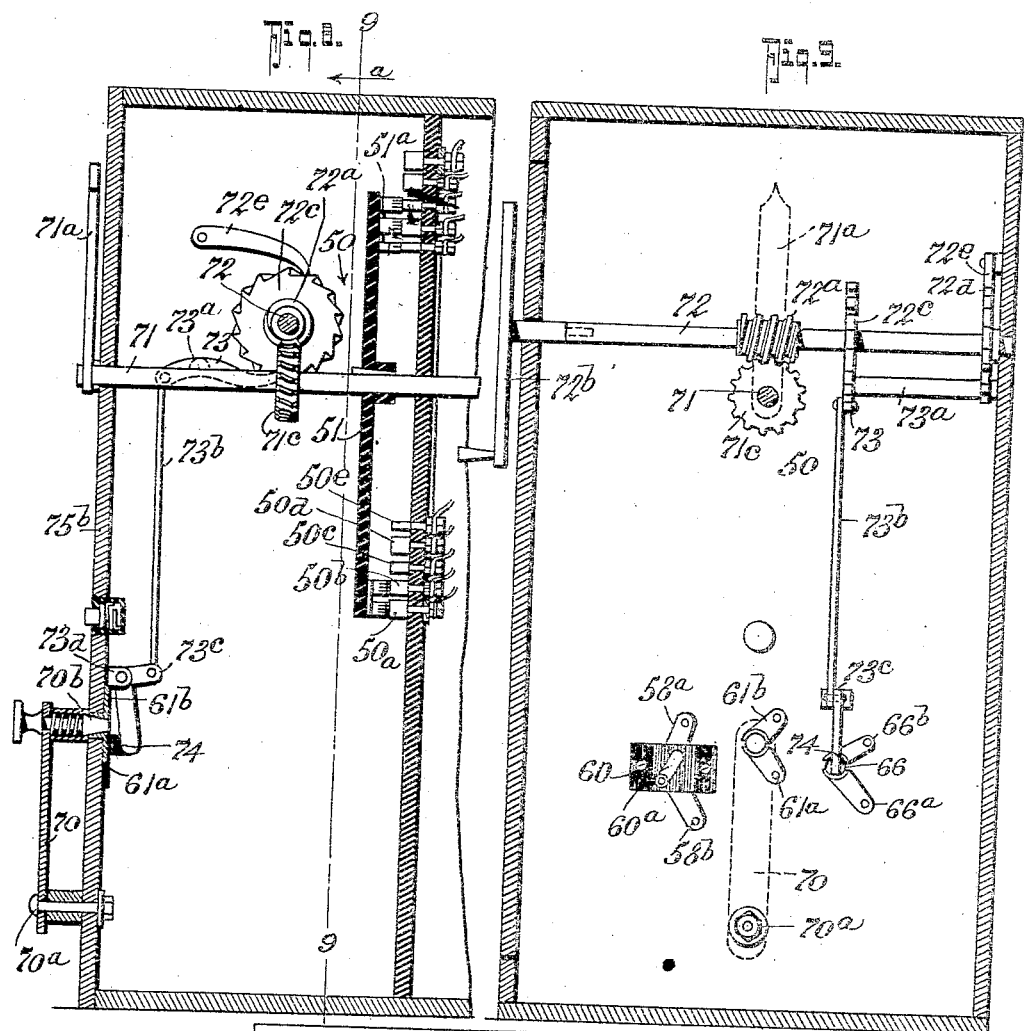
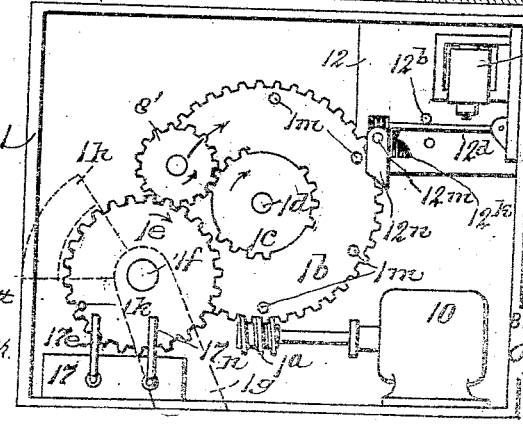
WITNESSES:
John T. Schrott
Charles H. Wagner
INVENTOR
Jean F. Webb, Jr.
BY
Fred G. Dieterich
ATTORNEYS.

UNITED STATES PATENT OFFICE.

JEAN F. WEBB, JR., OF DENVER, COLORADO, ASSIGNOR TO THE ELECTRIC SIGNAGRAPH AND SEMAPHORE COMPANY, INCORPORATED, OF NEW YORK, N. Y.

TRAIN SIGNALING AND CONTROLLING SYSTEM.

1,114,073.  Specification of Letters Patent.  Patented Oct. 20, 1914.

Application filed June 8, 1908. Serial No. 437,463.

*To all whom it may concern:*

Be it known that I, JEAN F. WEBB, Jr., residing at Denver, in the county of Denver and State of Colorado, have invented certain new and useful Improvements in Train Signaling and Controlling Systems, of which the following is a specification.

My invention relates to an improved electrically operated system for signaling trains to prevent collisions, etc., and generically my system provides means whereby the train despatcher can control the operation of all of the semaphores in his division, and if necessary he can stop a train independently of the engineer. This makes it practically impossible for accidents to occur.

My invention also includes a return signal apparatus whereby the semaphore will operate a signal in the despatcher's office when the semaphore is at danger position, to indicate to the despatcher that the semaphore is properly set.

My system also provides means whereby the way-station operator may operate certain predetermined semaphores at each side of his station, to signal a train which has inadvertently, or otherwise, run past the station without coming to a stop, the setting of such semaphore operating a bell signal in the despatcher's office, and thereby advising him that the semaphore has been set along the line.

My invention also includes those novel features which will be hereinafter first described in detail, and then be specifically pointed out in the appended claims, reference being had to the accompanying drawings, in which,—

Figure 12:
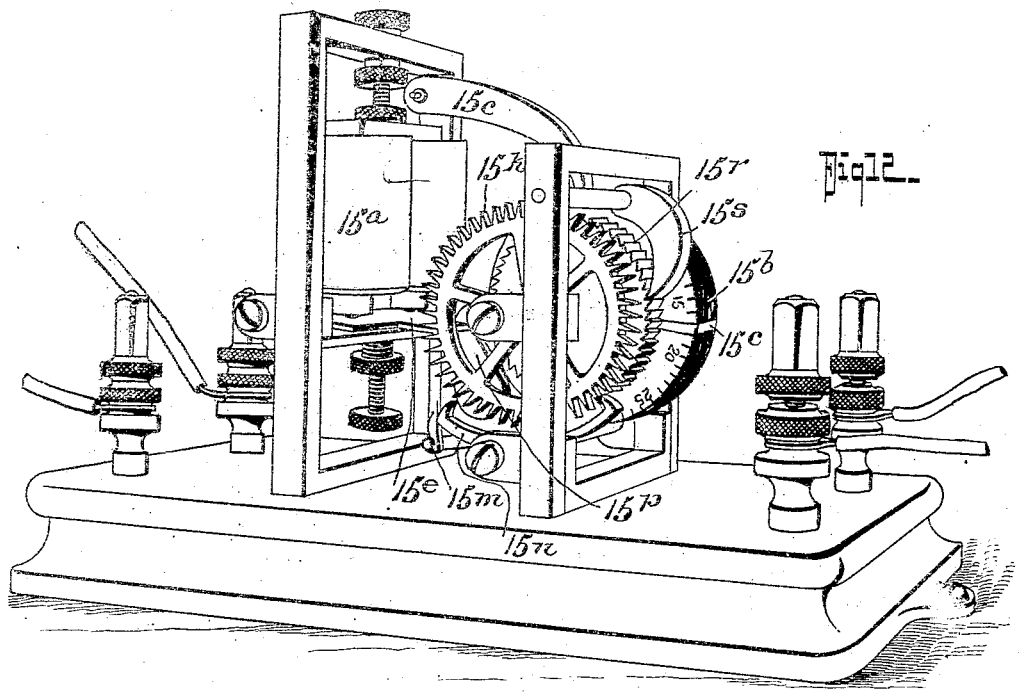

Figures 1 to 6, inclusive, are diagrammatic views of my complete system. Fig. 7, is a perspective view of a part of the despatcher's office, showing the despatcher's desk and switch-board. Fig. 8, is a detail, central section of a part of the switch board. Fig. 9, is a section on the line 9—9, of Fig. 8, looking in the direction of the arrow *a*. Fig. 10, is a similar section on the line 9—9 of Fig. 8, looking in the direction opposite to the arrow *a*. Fig. 11, is a diagrammatic view of a semaphore shaft operating mechanism. Fig. 12, is a perspective view of the selective mechanism or signagraph. Fig. 13, is a detail section of the circuit closer on the line 13—13 of Fig. 3.

In the drawings like numerals and letters of reference indicate like parts in all of the figures.

For convenience in the ready reading of the drawings, Figs. 1 to 5 inclusive, should be arranged in order from left and right, and read together. Referring now more particularly to such Figs. 1 to 5 inclusive, it will be seen that 1 represents the semaphore mechanism farthest from the despatcher's office, 2 the next one nearer, 3 the next, 4 the nearest and 5 represents the despatcher's station.

100 designates the track and 101 that section in front of the semaphore mechanism 1; 102 designates that section in front of the semaphore mechanism 2; 103 designates that section in front of the semaphore mechanism 3; and 104 designates that in front of the semaphore mechanism 4. A way-station located opposite to the semaphore mechanism 2, is indicated by the reference numeral 120, see Fig. 2 of the drawings.

The main line wires which are connected to all semaphore mechanisms and to the despatcher's office are designated by the numbers 200, 300 and 400 respectively, and the auxiliary line wires between the way-station 120 and the semaphore mechanisms 1 and 3 are respectively designated by the numerals 150, and 250. At the end of the division farthest from the despatcher's office the line wires 300 and 400 are electrically connected together by a bridge connection 201, as shown in Fig. 1 of the drawings. Each semaphore mechanism comprises, in its electrical equipment, a drive motor 10, a source of electric energy 11 therefor, a motor circuit switch relay 12, a positive and negative polarized relay 13 and 14, respectively, a selecting mechanism 15 (hereinafter termed the "signagraph") a source of electric energy 16 therefor, and a circuit closer 17.

As the electric wiring or circuit between the motor 10 the source of energy 11, the relay 12, the positive and negative relays 13 and 14 respectively, and the signagraph 15, are the same for all semaphore mechanisms, a detailed description of one will suffice for all.

*The semaphore wiring.*—Referring now to either of Figs. 1 to 4, it will be seen that the motor 10 has a terminal 10ᵃ connected by a wire 10ᵇ to the battery 11, while the other terminal 10ᶜ connects by a wire 10ᵈ to the contact post 12ʳ of the relay 12, the post contact 12ᵃ being electrically connected with the terminal 12ᵇ. The battery 11 is also connected by a wire 11ᵃ to the post 12ᶜ of the relay 12, which post is electrically connected to the armature 12ᵈ, as shown, so that when the armature engages the terminal 12ᵇ, the motor circuit will be closed. The relay 12 has a magnet 12ᵉ to operate the armature 12ᵈ, the magnet being connected to posts 12ᶠ—12ᵍ, as shown. Each relay 13 comprises a magnet 13ᵃ, a polarized armature 13ᵇ, a contact 13ᶜ, and each relay 14 consists of a magnet 14ᵃ, a polarized armature 14ᵇ, and a contact 14ᶜ, as shown. The magnets 13ᵃ and 14ᵃ of each semaphore relay 13 and 14 are connected in series with one another and in series with line wire 400. The contact 14ᶜ of the negative relay 14 is electrically connected to the post 12ᵍ of the relay 12, while the contact 13ᶜ of the positive relay 13 is electrically connected to the magnet 15ᵃ of the signagraph 15. The armatures 13ᵇ and 14ᵇ are electrically connected together to the battery 16, while the battery 16 also connects with the magnet 15ᵃ and with the contact segment 15ᶜ of the selective disk 15ᵇ of the signagraph. The contact pawl 15ᵈ of the signagraph is electrically connected to the post 12ᶠ of the relay 12. Each semaphore mechanism also includes a circuit closer 17, which comprises a pair of fixed contacts 17ᵃ—17ᵇ that connect through wires 18ᵃ—18ᵇ to the line wires 300 and 200 respectively. Each circuit closer 17 also includes a shaft 17ᶜ having a contact 17ᵈ to coöperate with the contacts 17ᵃ—17ᵇ and having an arm 17ᵉ, or lever, by means of which the shaft may be turned. Each circuit closer 17 also includes a second pair of contacts 17ᶠ—17ᵍ connected by wires 17ˣ and 17ʸ respectively to the track contacts 98 and 99 which are arranged adjacent to the track near the semaphore mechanism. A second shaft 17ᵏ has a contact arm 17ᵐ and an operating lever 17ⁿ coöperating with the contacts 17ᶠ—17ᵍ.

When it is desired to give the operator of the way-station 120 control of a semaphore at each side of his station, say the semaphores of semaphore mechanisms 1 and 3, then the circuit closers of such semaphore mechanisms are each provided with an additional pair of contacts 17ʳ—17ˢ, one of which, 17ˢ, is electrically connected to the magnet 12ᵉ of the relay 12, and the other 17ʳ connects to the contact 17ᵃ, and is electrically connected to the line wire 300. An auxiliary contacting arm 17ᵖ is also provided on the shaft 17ᵏ. This arm is normally held in contact with the fixed contacts 17ʳ—17ˢ, but it is moved out of engagement therewith when the shaft 17ᵏ is locked when the semaphore reaches a danger position, as will be hereinafter more clearly apparent. The semaphore of semaphore mechanism 2, in front of the way-station 120 is not controlled by the way-station operator, and is consequently not provided with the auxiliary contacts 17ʳ—17ˢ.

*The way station.*—The circuit closer 17 of the semaphore mechanism 2, however, has auxiliary contacts 17ᵛ—17ʷ, that 17ᵛ being electrically connected to the contact 17ᵃ, while that 17ʷ, connects through a wire 120ᵃ with the magnet 121ᵃ of the relay 121 at the way-station 120. The magnet 121ᵃ is also electrically connected to a local battery 122, and when energized serves to cause the armature 121ᵇ to close the call bell circuit at the terminals 123—123ᵃ, the bell circuit including the bell 124 and a battery 125, as shown. The armature 121ᵇ has a stepped block 121ᶜ by means of which and the armature 121ᵈ of the releasing magnet 121ᵉ, the armature 121ᵇ is locked in the various positions. The magnet 121ᵉ has one terminal connected with one terminal of a push button 128, the other terminal of which connects with the battery 122. The push button 126 has one terminal connected to the local battery 122, while its other terminal connects with the auxiliary line wire 150 through a lead 120ᶜ. A third push button 127 has one terminal connected to the battery 122 and its other terminal connected to the auxiliary line wire 350, by a lead 120ᵈ (see Fig. 2).

*Wiring of the despatcher's station.*—The despatcher's switch-board includes a universal switch 50, having an outer annular contact section formed of a series of spaced studs 50ᵃ, which are electrically connected together, and within such contact series is a continuous ring 50ᵇ that surrounds an annular series of spaced and separated contacts 50ᶜ. Within the circle of contacts 50ᶜ, and spaced therefrom, is another continuous ring 50ᵈ and within that is another annular separate series of contacts 50ᵉ. In practice the number of contacts 50ᶜ is equal to the number of contacts 50ᵉ or the number of contacts 50ᵃ, there being one contact 50ᵃ, one contact 50ᶜ and one contact 50ᵉ for each semaphore to be operated in the system. An arm 51 rotatable over the contacts 50ᵃ, 50ᵇ, 50ᶜ, 50ᵈ, and 50ᵉ, carries two sets of brushes, one 51ᵃ having three forks, one of which engages the contacts 50ᵉ and the other engages the ring 50ᵈ. The other fork of the brush engages with the contacts 50ᶜ. The other brush 51ᵇ has two forks, one to engage the ring 50ᵇ and another to engage the contact 50ᵃ, the arm 51 being operated in a manner hereinafter described. The despatcher's switch-board is also provided with a series of relays, R¹, R², R³, R⁴, one for each semaphore and it is also provided with a corresponding series of signal lamps, L¹, L², L³, L⁴, one lamp for each semaphore, the lamp L² being operated through the relay R³; the lamp L³ through the relay R²; and so on.

Each relay, R¹, R² etc., consists of an operating magnet 52, whose armature 52ᵃ closes the light circuit through its respective lamp L¹, L², etc., by short-circuiting the contacts 52ᵇ, 52ᶜ of the respective lamp circuit when the magnet 52 is energized. Each lamp L¹, L², etc., has one of its terminals connected to a lamp-battery 53, and all the contacts 52ᶜ of the relays R¹, R², etc., are together connected to the other terminal of this battery 53. Each lamp L¹, L², etc., has its other terminal connected to the respective contact 52ᵇ of its respective relay (see Fig. 5). The armature 52ᵃ has its stepped block 52ᵈ to be engaged by the armature 52ᶠ of the releasing magent 52ᵉ. The operating magnet 52 of each relay R¹, R², etc., has one of its terminals connected to the armature 54ᵇ of a "light on" relay 54, while the other terminal of each magnet 52 connects to its respective contact 50ᶜ on the switch 50. Each releasing magnet 52ᵉ has one of its terminals connected to the armature 55ᵇ of a "light off" relay 55. The other terminal of the respective magnet 52ᵉ connects with its respective contact 50ᶜ of the switch 50. The "light on" relay 54, it is to be noted, is a general relay, i. e., it is common to all relays R¹, R², etc., as is also the relay 55 that turns out the light. The relay 54 has a magnet 54ᵃ, one terminal of which connects through a wire 54ᶜ to the line wire 200, while the other terminal of the magnet 54ᵃ connects through wire 54ᵈ to the contact 60ᵃ of a plug switch 60 whose other contact 60ᵇ connects with a main switch battery 59. The relay 55 has a magnet 55ᵃ, one terminal of which connects through a wire 55ᶜ with the line wire 400, the other terminal of the magnet 55ᵃ connects through a wire 55ᵈ with one terminal of a push button 57, the other terminal of which connects with the contact segment 58ᵃ of a plug switch 58. The other contact segment 58ᵇ of the plug switch connects with the battery 59.

The contact points 55ᵈ and 54ᵉ of the relays 55 and 54 respectively, are connected together by a wire 56ᵃ to a battery 56, which in turn is connected through a wire 56ᵇ to the ring 50ᵈ of the switch 50. The battery 59 is also connected to a segment 61ᵃ of what I term a "rest-plug," the other segment 61ᵇ of the plug is electrically connected to one terminal of the magnet 62ᵃ of a bell relay 62; the other terminal of the magnet 62ᵃ connects through a lead 62ᵈ to the line wire 200. The magnet 62ᵃ operates an armature 62ᵇ that is electrically connected in a bell circuit including the bell 63, the battery 64 and contact 62ᶜ.

65 designates a second main battery that has one terminal connected to a contact segment 66ᵃ of a switch plug, whose other segment 66ᵇ connects through a wire 66ᶜ with the contact lugs 50ᵃ, the switch plug 66 being hereinafter termed the "signagraph plug." The main batteries 59 and 65 have opposite terminals connected through a wire 67 to the line wire 300. The despatcher's office is also provided with a positive relay 13ᵃ, the same as the semaphores, the operating magnet 13ᵃ of which has one terminal connected to the line wire 400 and the other connected through a wire 68 to the ring 50ᵇ of the switch 50. The relay 13ᵃ in the despatcher's office operates a "dummy" indicator signagraph 15ˣ in the despatcher's office that keeps a tally on those of the semaphores and guides the operator. The signagraph 15ˣ has its operating magnet 15ᵃ connected through a battery 16ˣ to the terminal 13ᶜ of the relay 13 and is also connected to the armature 13ᵇ thereof, as shown in Fig. 5, so that when magnet 15ᵃ is energized it will operate the armature 15ᶜ to turn the disk 15ʸ.

Figure 6:
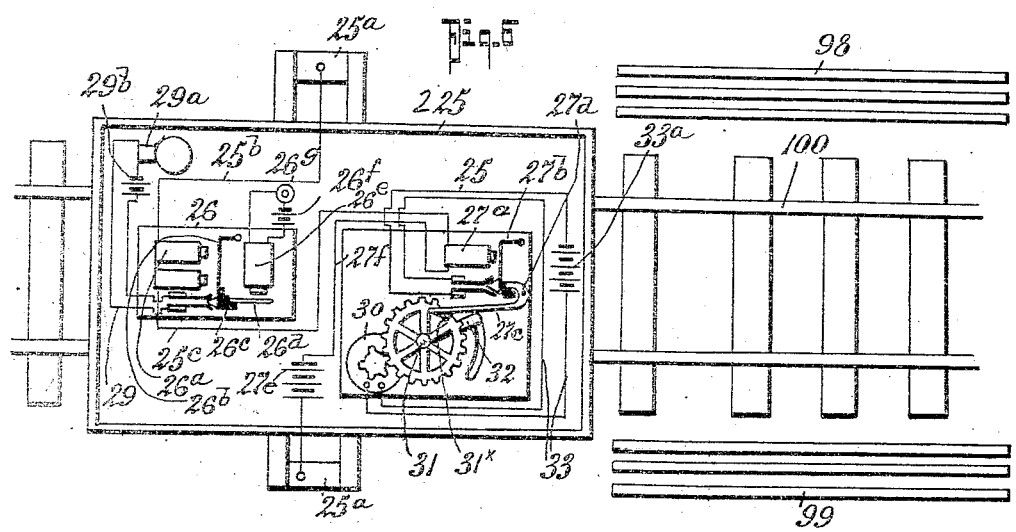

*The train mechanism.*—In Fig. 6, I have shown diagrammatically, a train carried mechanism for coöperating with the track contacts and the semaphore circuit closer whereby the train may be stopped at the will of the despatcher. I make no specific claim to the mechanical construction of parts shown in Fig. 6, as that forms the subject-matter of a separate application.

The car is represented by the reference numeral 225 and carries a pair of brushes 25ᵃ that are adapted to engage the track contacts 98 and 99 and one of which is connected through a wire 25ᵇ with the operating magnet 26ᵃ of a relay 26. The magnet 26ᵃ is connected through a wire 25ᶜ with a relay magnet 27ᵃ that is in turn connected through a wire 27ᶠ with a battery 27ᵍ which has its other terminal connected to the other brush 25ᵃ of the car. The magnets 26ᵃ of the relay 26 operate an armature 26ᵇ to close the terminals of the bell or signal circuit 29 carried by the car, and including the battery 29ᵇ and the bell 29ᵃ or other suitable signal. The armature 26ᵇ has a stepped block 26ᶜ so that the armature may be locked in its various positions by the armature 26ᵈ of the releasing magnet 26ᵉ that is controlled by a push button 26ᵍ in a circuit containing the magnet 26ᵉ and the battery 26ᶠ. The relay magnet 27ᵃ operates the armature 27ᵇ to close the terminals of the motor circuit 33 that includes the motor 30, and the battery 33ᵃ, the motor 30 being geared to a shaft 31 that has an arm 32 for moving it to its normal position irrespective of the motor and has a gear that carries a pin 31ˣ to operate the locking lever 27ᶜ hereinafter again referred to. The shaft 31 is connected in any approved manner with the valve of an air-brake system, not shown, so that when the motor 30 operates the shaft 31 the air-brake valve will be opened to permit the air to set the air-brake. The armature 27ᵇ is provided with a stepped block to coöperate with the locking lever 27ᶜ that is pivoted at 27ᵈ, the lever 27ᶜ being operated to release the armature 27ᵇ and permit it to open the motor circuit by the pin 31ˣ before referred to.

*The signagraph.*—The signagraph is particularly disclosed in Fig. 12, by reference to which it will be seen that the armature 15ᵉ is connected to an escapement verge 15ⁿ by a rod 15ᵐ, the verge 15ⁿ coöperating with the escapement wheel 15ᵏ to limit the movement of the shaft that carries the contact disk 15ᵇ. The armature 15ᵉ operates the shaft to turn the disk 15ᵇ by a pawl 15ᵖ that is carried by the armature 15ᵉ and engages a ratchet disk 15ʳ on the shaft, the disk 15ʳ being held from backward movement by a pawl 15ˢ as indicated.

*The semaphore mechanism.*—Fig. 11, is a diagrammatic detail view of the semaphore mechanism. It is to be seen that the semaphore shaft 1ᶠ carries a gear 1ᵉ that has a pin 1ᵏ that operates the levers 17ᶜ—17ᶜ of the circuit closer 17, hereinbefore referred to. Upon a shaft 1ᵈ is mounted a mutilated gear 1ᶜ that turns with a drive gear 1ᵇ that is geared to the motor shaft through the medium of a worm 1ᵃ, as shown. The mutilated gear 1ᶜ serves to alternately engage the gear e¹, and relieve the gear e¹ from such engagement at times, for a purpose presently more fully to appear. The gear 1ᵇ carries a pin 1ᵐ that operates the lever 12ⁿ on a shaft 12ᵐ that carries the stepped block 12ᵏ that locks the armature 12ᵈ of the relay 12 in its position. The semaphore 1ᵍ is carried by the shaft 1ᶠ and is counterweighted as at 1ʰ to cause the shaft 1ᶠ to bring the blade in its horizontal or "danger" position whenever the mutilated portion of the gear 1ᶜ registers with the gear e¹, as will be hereinafter more fully explained. The semaphore blade is prevented from being turned by the counterweight from the position shown in Fig. 11 to the danger position, by reason of the worm and gear connections 1ᵃ—1ᵇ, as the gear 1ᵇ cannot turn the worm, owing to the relative diameters being such that the friction produced when an attempt is made to turn the worm 1ᵃ by the gear 1ᵇ is so great as to prevent the gear 1ᵇ turning the worm 1ᵃ.

*The despatcher's switchboard construction.*—In Figs. 7, 8, 9, and 10, I have illustrated the despatcher's desk and switchboard construction. By reference to these figures it will be seen that the desk and switchboard which is designated by the numeral 75 has a light-board portion 75ᵃ, on which the lights L¹, L², etc., are carried. The part 75ᵇ is also provided for the universal switch 50 and its operating mechanism and also for the hand operated plug switch 70. The arm 51 of the universal switch 50 is mounted on a rotatable shaft 71 that carries a pointer 71ᵃ on the outside of the switch-box to coöperate with indicating dial 71ᵇ on the front of the switch-box (see Figs. 7 and 8). The shaft 71 carries a worm gear 71ᶜ that meshes with a worm 72ᵃ on a transverse shaft 72 that extends to the outside of the casing 75, and is operated by a handle 72ᵇ, (see Fig. 7). The shaft 72 carries a ratchet disk 72ᶜ that coöperates with a lock lever 73 hereinaft. again referred to, and it also carries a second ratchet 72ᵈ that coöperates with a latch pawl 72ᵉ pivoted to the casing, the latch pawl 72ᵉ and the ratchet disk 72ᵈ that coöperates therewith serving to prevent rotation of the shaft 72 in more than one direction while the lever 73 engaging the ratchet disk 72ᶜ prevents rotation of the shaft in an opposite direction. A lever 73 is fulcrumed at 73ᵃ and connects with a rod 73ᵇ that in turn connects with a bell crank lever 73ᶜ that is fulcrumed at 73ᵈ to the front wall of the casing section 75ᵇ. The lever 73ᶜ is operated by an insulated plug 74 that projects into the aperture of the plug switch 66 and is operated in a manner hereinafter described.

70 designates the hand controlled plug switch lever, which is pivoted at 70ᵃ and carries a spring pressed plug 70ᵇ that may be withdrawn from the plug-switch.

Operation: Assume the despatcher's switch arm 51 to be in position with any contact and assume that the plug switch 70 is in the "rest-plug" to short-circuit the contacts 61ᵃ—61ᵇ. This is the normal position for the plug switch 70. Thus it will be seen that the shaft 72 is locked from rotation and this in turn locks the shaft 71 from rotation. Now assume that a train is passing from the despatcher's station toward the semaphore mechanism 1 and assume that the train is to pass semaphore mechanisms 4, 3, 2 and 1 in rotation and all the other semaphore mechanisms in the division between the semaphore mechanism 4 and the despatcher's office 5. Supposing it is desired to set the semaphore of semaphore mechanism No. 2, so as to signal the engineer of the approaching train, before he reaches the way-station 120, to stop his train. The despatcher in his office then moves the plug switch 70 with the plug 70ᵇ into the signagraph plug contact 66 to close the circuit between the contacts 66ᵃ—66ᵇ. The operation of placing the plug switch 70 into the signagraph plug 66 causes the bell crank lever 73ᶜ to be rocked and forces the lever or pawl 73 out of engagement with its ratchet disk 72ᶜ, thus permitting the shaft 72 to be rotated by the crank 72ᵇ in a direction such as to turn the arm 51 in the direction of the arrow in Fig. 5. The operator turns the crank 72ᵇ until the indicator 71ᵃ indicates the proper semaphore, and at this time the arm 51 will be in such position that the brushes 51ᵃ—51ᶜ will aline with the contact 50ᶜ and the adjacent contact 50ᶜ inclosed within the dotted lines shown in Fig. 5, thus bringing into circuit the relay R² through the medium of the brush 51ᵃ and also making and breaking the circuit between the contact lugs 50ᵃ and the ring 50ᵇ a definite number of times. Each make and break of the circuit between the contact lugs 50ᵃ and ring 50ᵇ causes an impulse to be sent out from the battery 65 across the switch 66 to the lugs 50ᵃ and to the ring 50ᵇ via the brushes 51ᵇ, to the wire 68 and from thence through the despatcher's positive relay magnet 13ᵃ to line wire 400. From the line wire 400 the current flows in turn through the positive and negative relays 13 and 14 respectively of all of the semaphores on the line, passing over the bridge 201 at the end of the division and returning via line wire 300 to the despatcher's station. The current then passes from line wire 300, at the despatcher's station, through wire 67 to return to the battery 65. Each impulse as the brushes 51ᵇ pass over the lugs 51ᵃ operates the positive relays one time, which causes the positive relay magnets 13ᵃ of all semaphores and of the despatcher's station to close the signagraph circuit between the armature 13ᵇ and contact 13ᶜ, thus operating the signagraph 15 in each semaphore mechanism and the dummy signagraph 15ˣ in the despatcher's office one step. It being understood that a contact strip 15ᶜ of each respective signagraph in each respective semaphore is arranged to come into engagement with its respective pawl 15ᵈ at the proper time, that of the signagraph in Fig. 2, coming in contact when the arm 51 reaches the position indicated in dotted lines in Fig. 5. As soon as the arm 51 has reached its proper position and thus stepped all the signagraphs, a corresponding number of times to bring the desired semaphore into circuit, the operator withdraws the plug 70ᵇ from the plug switch 66 and inserts it in the semaphore switch to close the circuit between the contacts 58ᵃ—58ᵇ. When the plug switch 70 is removed from the switch plug 66 the lever 72 will again engage its ratchet 72ᶜ and lock the shaft 72 from turning so that the signagraph cannot be tampered with or moved out of step.

When the operator puts the switch 70 into the plug 58 to close the circuit between the contacts 58ᵃ—58ᵇ the insertion of the plug moves the contact 60ᵇ into engagement with the contact 60ᵃ and closes the circuit at this point. The despatching operator then pushes the button 57 to close the semaphore circuit. This causes current to flow from battery 59 through wire 67 to line wire 300 and along line wire 300 to the end of the division across the bridge 201 and through all the positive and negative relays 13 and 14 of all semaphores returning via line wire 400 to the despatcher's station, from which line wire, the current passes through wire 55ˣ through the light-off relay magnet 55ᵃ and from thence via wire 55ʸ back to the push button 57 and from there across the plug switch 58 to the battery 59, thus completing the circuit. The magnet 55 at this time normally performs no function. The current thus sent through the line wires 300 and 400 being a negative one will not operate any of the positive relays on the line wire, but will only operate all negative relays closing the circuits controlled thereby at such relays but, by reason of the fact that only one semaphore (that No. 2, see Fig. 2) has its contact 15ᶜ in engagement with its pawl 15ᵈ no current will flow through the signagraphs of any station excepting that at semaphore No. 2, and no current will flow through the operating magnet 15ᵃ of any station since such magnet is controlled by the positive relays that are not affected by the negative current from battery 59.

The current energizing the negative relays of all semaphores closes the local circuit of semaphore No. 2 between the contacts 14ᵇ and 14ᶜ permitting the local current from battery 16 to pass across from contact 15ᶜ to contact 15ᵈ and from thence through the relay magnet 12ᵉ of the relay 12 and return to battery via contact 14ᶜ and armature 14ᵇ of the relay 14. The energizing of the magnet 12ᵉ of the relay 12 causes it to draw up its armature and close the local motor circuit at semaphore No. 2, thus permitting the battery 11 to force current through the motor 10 and set the same in operation. As the motor 10 starts operating it will turn the gear 1ᵇ sufficient to release the gear portion of the mutilated gear 1ᶜ from the gear eʹ and thus permit the weight 1ʰ to move the shaft 1ᶠ to bring the semaphore 1ˢ into a horizontal or danger indicating position. As soon as the gear portion of the gear 1ᶜ disengages the gear eʹ the pin 1ᵐ will operate the lever 12ⁿ and release the armature 12ᵈ to break the motor circuit. As the shaft 1ᶠ moves into its danger position the pin 1ᵏ carried by the gear 1ᶜ, will engage the lever 17ᵉ of the circuit closer 17, momentarily closing the circuit across contacts 17ᵃ—17ᵇ of semaphore No. 2 to close the circuit controlled thereby, which will be again referred to presently. The pin 1ᵏ then engages the lever 17ⁿ to close the track circuit at the contacts 17ᶠ and 17ᵍ of semaphore mechanism No. 2. The closing of the circuit at contacts 17ᵃ—17ᵇ causes a short-circuiting of line wire 200 and 300 at station No. 2. Current from the battery 59 will then flow through wire 67 to line wire 300 across the short circuit at semaphore mechanism No. 2 to line wire 200 back to the despatcher's station and from line wire 200 at the despatcher's station the current will pass down via wire 54ˣ through the light-on relay 54 and from thence via wire 54ʸ to switch 60 across switch 60 to battery 59 thus completing the circuit. The energizing of magnet 54ᵃ of the light-on relay 54 causes it to draw up its armature and close the circuit at contacts 54ᶜ and armature 54ᵇ, thus permitting the battery 56 to pass a current through wire 56ˣ across contacts 54ᶜ—54ᵇ to magnet 52 of relay R² and from thence to contact 50ᶜ under brush 51ᵃ from whence the current passes across brush 51ᵃ to ring 50ᵈ and return to battery 56, thus energizing the operating magnet 52 of relay No. 2, it being understood that the current does not pass through any of the other relay magnets 52 for the reason that their circuits are open at switch 50. The energizing of magnet 52 in relay R² causes its armature 52ᵃ to close the circuit for lamp L² at contacts 52ᵇ—52ᶜ, thus permitting battery 53 to force a current through lamp L² to light the same thereby indicating on the despatcher's switch-board that semaphore mechanism No. 2 has been properly set.

Let us assume now that the train has reached station 120 at semaphore mechanism No. 2 and has come to a stop before the train carried brushes 25ᵃ engage the track contacts 98—99 at station No. 2. The despatcher now desiring to give the train the "right of way" and lower semaphore 2, he merely presses the button 57, thus sending another impulse over the line to again operate the negative relay 14 at station No. 2, which causes the circuit through magnet 12ᵉ from battery 16 to be again closed. The energizing of magnet 12ᶜ in such manner again closes the local motor circuit through battery 11 and sets the motor 10 in operation again. As the motor 10 operates, the mutilated gear 1ᶜ will turn to bring one of its gear portions into operative engagement with the gear e' and turn the shaft 1ᵗ to lower the semaphore blade 1ˢ to its safety position and as soon as the semaphore blade has reached its safety position the pin 1ᵐ will engage the lever 12ⁿ to release the armature 12ᵈ thereby breaking the local motor circuit and permitting the motor 10 to stop. The engineer may then start his train, and proceed in the usual way. Now suppose instead of stopping at station No. 2 when the semaphore was set at its danger position, the engineer, for some reason or other, attempts to pass the station, it is to be noticed that while the semaphore blade is at the horizontal or danger position, the pin 1ᵏ will be in engagement with the lever 17ᵃ and maintain the track circuit closed at contacts 17ᵗ—17ˢ of semaphore No. 2 to short-circuit the track contacts 98—99. As the train passes over such contacts the brushes 25ᵃ will come into electrical engagement therewith causing the brushes 25ᵃ to become short-circuited. This permits a current to flow from battery 27ᵃ through magnet 27ᵉ, through magnets 26ᵃ of the relay 26 to one of the brushes and from thence across the short-circuit via track contacts 98 and 99 to the other brush 25ᵃ and back to the battery 27ᵃ. This closing of the car circuit causes magnet 27ᵃ to close the local car motor circuit through battery 38ᵃ by drawing up its armature 27ᵇ thus setting the motor 30 into operation to turn on the air brake valve that is controlled by the shaft 31. At the same time, the magnets 26ᵃ will throw their armature 26ᵇ to close the local bell circuit 29 and thus operate the call bell 29ᵃ to notify the engineer that his train will be stopped.

In practice the gearing between motor 30 and shaft 31 is so arranged that several seconds time elapses after bell 29ᵃ is rung before the valve will be opened and the train stopped, thus giving the engineer an opportunity to rectify his error and bring the train to a stop. As soon as the air valve (not shown) that is controlled by shaft 31, is opened to set the air brakes the pin 31ˣ will rock the lever 27ᶜ to release the armature 27ᵇ and break the motor circuit 33 thus permitting the motor 30 to come to a stop. In Fig. 6, the parts are shown with shaft 31 in a position at which the air brake valve would be open. By pushing the button 26ˢ and energizing the magnet 26ᵉ the armature 26ᵇ will be released to open the bell circuit and stop the bell 29ᵃ from ringing. Thus it will be seen that the train will be automatically stopped independent of the engineer's control should he attempt to run by a set semaphore.

So long as the switch 70 remains in the semaphore plug 58 the semaphore may be raised or lowered by simply pushing the button 57. If the semaphore is in its danger position and it is desired to return it to its normal position, the button 57 is pushed as before stated. The signaling circuit at contacts 17ᵃ—17ᵇ being broken, however, no effect of the pushing of the button will be had on the light-on relay, but the current from the battery 59 will flow through wire 67 to line wire 300 to the end of the division across bridge 201 returning via line wire 400 to the despatcher's station from which the current flows through wire 55ˣ through light-off relay magnet 55ᵃ and from thence through wire 55ʸ back to the push button 57 and return to battery through plug switch 58. This energizes the light-off relay to close the circuit at contact 55ᶜ with armature 55ᵇ. The current from battery 56 then flows to contact 55° across armature 85° to releasing magnet 52° of relay R² energizing the same and flowing from thence to contact 59° at switch 50 across brush 51° to ring 50° and from thence returning to battery 56. The energizing of the releasing magnet 52° of relay R² serves to operate its armature 52¹ so as to release the armature 52° and break the light circuit at contacts 52°—52° thus extinguishing the light and indicating that the semaphore has reached its safety position. After the semaphore has reached its safety position, the despatcher moves the switch 70 into the rest plug 61 which is the normal position of the switch 70, see Fig. 7. Supposing that the train passes station 120 and semaphore 2 ahead of time, so that the despatcher, at the despatcher's station, is not aware that the train has passed, when he desires to set the semaphore blade of semaphore mechanism 2, or for any other reason, supposing the train has passed station 120 and the train station operator desires to stop the train at semaphore No. 1, by my system the way-station operator can throw semaphore No. 1 to its danger position and then he loses control thereover so that he cannot return it to its safety position. At the same time the despatcher's office is notified that the semaphore has been thrown and the despatcher alone can return it to its safety position. This is accomplished in the following manner, to wit: The station operator seeing a train go by and desiring to stop it when it reaches semaphore No. 1, presses his button 126 which closes a circuit from the battery 122 through wire 120° and auxiliary line wire 150 to magnet 12° of the relay 12 and from thence to contact 17° of the circuit closer 17 across bar 17° to contact 17° and from thence via wire 18° to line wire 300, the current flowing along line wire 300 to station 120 and down wire 18° and 120°, see Fig. 2, back to the way-station operator's switch-board, from which it passes back to battery 122 completing the circuit. This energizes magnet 12° at semaphore No. 1 and closes the local motor circuit of such semaphore thereby permitting the motor 10 to move the semaphore to its danger position in a manner hereinbefore described for semaphore No. 2.

As the semaphore 1 moves to its danger position it will close the contacts 17°—17° momentarily but inasmuch as the switch 50 is not in proper position to permit the current to pass through relay R¹ such relay will not be affected. In order to notify the train despatcher that semaphore No. 1 has been set I provide an auxiliary mechanism for that purpose.

The momentarily closing of the circuit at contacts 17°—17° of circuit closer 17, of semaphore mechanism No. 1, momentarily short-circuits line wires 200 and 300, thus permitting current from battery 59 to flow through wire 37 to line wire 300 across contacts 17°—17° at semaphore mechanism No. 1, back through wire 200 to the despatcher's station, and from line wire 200 the current passes through wire 62° to the magnet 62° of the despatchers' bell relay 62, to rest-plug 61 across contacts 61°—61° thereof, back to battery 59, thus energizing magnet 62° at the despatcher's office to close his local bell circuit from battery 64 to operate the bell 63 and notify the despatcher that a semaphore has been operated. As soon as the way-station operator has thrown the semaphore blade of semaphore mechanism No. 1, he notifies the despatcher to that effect by telegraph, or in any other usual manner. The train despatcher then turns the switch 50 to bring semaphore mechanism No. 1 into circuit, and at the proper time by moving switch 70 into plug 58 and pressing button 57, he operates semaphore mechanism No. 1 to move the blade into its safety position and give the train the right to proceed. In a like manner the way-station operator at station 120 by pushing button 127 can operate semaphore mechanism No. 3, so as to signal a train going in an opposite direction.

Whenever semaphore mechanism No. 2 has been operated, the moving of lever 17° will momentarily close a circuit across contacts 17°—17°, thus permitting current to flow from battery 122 through magnet 121° in the station office to wire 120° across contacts 17°—17°, returning via wire 120° to battery 122, thus causing armature 121° to close the local way-station call bell circuit through battery 125 to operate the bell 124 thus notifying the way-station operator that his semaphore has been set so as to put him on guard that he may watch for the coming train and easily report the same.

Supposing that the despatcher is endeavoring to get a way-station operator on the usual telegraph line, with which all railway stations are now equipped, and he can get no answer, the despatcher then moves the semaphore for that station to a safety position, thus ringing the call bell 124 at that station and the bell 124 continues ringing until the push button 128 is operated to break the call bell circuit, thus compelling the attention of the way-station operator.

From the foregoing it will be seen that the train despatcher has absolute control over all semaphores and can perform the following functions, to wit:—He can select any semaphore in his division from his office, and having selected such semaphore, he can move the same either into a danger position or into a safety position by means under his direct control. Furthermore, the despatcher can stop a train at any desired semaphore by selecting said semaphore and setting it to a danger position to short-circuit the corresponding track contacts so that as the train passes thereover the train stopping mechanism carried by the train will be operated. This despatcher can also give a call signal to any way-station operator by simply setting the semaphore at such station.

It is to be noted that the way station operator is given partial control over certain predetermined semaphores, *i. e.*, he may move such predetermined semaphores to their danger position but he is unable to return them to their safety position. It is also to be noted that when a semaphore is to be moved to its danger position by a way-station operator a signal is given to the despatcher notifying him to that effect, such signal being given absolutely independent of the way-station operator so that he cannot move his predetermined semaphores to their danger position without the knowledge of the despatcher.

From the foregoing description taken in connection with the accompanying drawings it is thought the complete construction, operation and arrangement of my system will be readily apparent to those skilled in the art to which the invention appertains, and I desire to say that in this application I make no specific claims to the specific mechanical construction of the semaphore mechanism *per se*, nor do I make a specific claim to the mechanical construction of any of the semaphore relays or circuit closers *per se*, as they form the subject-matters of separate applications.

It is obvious that numerous changes within the skill of the electrical engineer, and others skilled in the art, may be made in the wiring and the connections between the various parts without departing from my invention and the scope of the appended claims, and I desire to further state that in this application I also do not make specific claim to the mechanical construction of the signagraph, *per se*, as that forms the subject-matter of other applications.

What I claim is:

1. In an electric system of the character stated, a despatcher's station and a series of semaphore stations, a semaphore selecting mechanism, and a coöperating semaphore operating mechanism at each semaphore station, said operating mechanism including means for moving the semaphore from out of any position it may be in to its opposite position when affected by an electrical impulse of the same character as that required to move it to the first position, three line wires connecting said semaphore stations with said despatcher's station, direct current operative means connected with two of said line wires and controllable at the despatcher's station for actuating a predetermined semaphore selecting mechanism to bring the respective semaphore operating mechanism into coöperative relation with the despatcher's station, direct current operative means controlled at the despatcher's station and connected with said two line wires for completely actuating said semaphore operating mechanism to move the respective semaphores from one position to another and back again at the will of the operator, a return signal at the despatcher's station, and means controllable by the movement of said semaphore operating mechanism and connected with one of said two line wires and with the third of said line wires for operating said return signal.

2. In a semaphore-operating and signaling system, a despatcher's station and switch-board, a set of semaphore stations each including a selecting mechanism and an operating mechanism, said operating mechanism including means for moving the semaphore from out of any position it may be in to its opposite position when affected by an electrical impulse of the same character as that required to move it to the first position, a selecting circuit and an operating circuit connecting said stations and including a pair of common line wires, sources of electric energy for said selecting and operating circuits, means at the despatcher's station for controlling the operation of the selecting circuit to operate the semaphore selecting mechanism and thereby operatively connect a particular semaphore operating mechanism coöperatively with the operating circuit, means under control of the despatcher for bringing the operating circuit into operation to cause the semaphore operating mechanism of the semaphore station so selected to operate to move the semaphore from out of any position it may be in to its opposite position, return signals at the despatcher's station, a main return signal setting circuit common to all of said stations, said signal setting circuit including one of said pair of line wires, and including a third line wire connecting said stations, return signal selecting and setting mechanism at the despatcher's station, coöperating with said second-mentioned means to select and set the return signals, operative connections between said signal setting mechanism and said return signal circuit for setting a selected one of said signals at the despatcher's station when the selected semaphore is operated.

3. In a system of the class described, a despatcher's station and switchboard, a set of semaphore stations each including selecting mechanism and semaphore operating mechanism, said operating mechanism including means for moving the semaphore from out of any position it may be in to its opposite position when affected by successive electrical impulses of the same character, a main selecting circuit connecting said stations, an operating circuit also connecting said stations, said circuits including common line wires, means at the despatcher's station for bringing into operation the selecting circuit to operate said selecting mechanisms to select a particular semaphore station, means under control of the despatcher for bringing the operating circuit into operation to set the semaphore operating mechanism of the selected semaphore into operation to move the selected semaphore from any position to another, a return signal setting circuit connecting said stations, means governed by the movement of the respective semaphores for energizing said return signal setting circuit, return signals at the despatcher's station; return signal selecting and operating mechanisms coöperative with said second mentioned means at the despatcher's station and connected with said signals and with said return signal setting circuit whereby a signal will be set corresponding to the selected semaphore, and means for disconnecting the respective return signals.

4. In a semaphore operating and signaling system, a despatcher's station, a set of semaphore stations, semaphore selecting and semaphore operating mechanisms at each of said semaphore stations, a selecting circuit connecting said semaphore stations with said despatcher's station, said despatcher's station including a selecting switch in said selecting circuit, an operating circuit connecting said stations all being arranged whereby the despatcher may select a predetermined station and effect the operation of the semaphore at said station, combined with a way station, circuit connections between said way station and predetermined semaphore operating mechanisms and means at said way station controlled by the way station operator for manipulating said connections to effect the operation of predetermined semaphores and thereby cause said predetermined semaphores to move in one direction independently of the despatcher.

5. In a semaphore operating and signaling system, a despatcher's station, a set of semaphore stations, semaphore selecting and semaphore operating mechanisms at each of said semaphore stations, a selecting circuit connecting said semaphore stations with said despatcher's station, said despatcher's station including a selecting switch in said selecting circuit, an operating circuit connecting said stations all being arranged whereby the despatcher may select a predetermined station and effect the operation of the semaphore at said station, combined with a way station, circuit connections between said way station and predetermined semaphore operating mechanisms, means at said way station controlled by the way station operator for manipulating said connections to effect the operation of predetermined semaphores and thereby cause said predetermined semaphores to move in one direction independently of the despatcher, a set of return signals in the despatcher's station, and means controlled by the movement of the semaphores for setting the return signals, a special signal in the despatcher's office, and means controlled by the semaphores so set by the way station operator for operating said special signal in the despatcher's office.

6. In a semaphore operating signaling system, a despatcher's station, a set of semaphore stations, electrically operated selecting and operating mechanism at said semaphore stations, a selecting circuit connecting all of said stations, a selecting switch in said selecting circuit, an operating circuit also connecting all of said stations, all being arranged whereby the despatcher may select a predetermined semaphore and then operate the same, combined with a way station, means controlled by the way station operator for operating predetermined semaphores to move them independently of the despatcher, an emergency signal at the despatcher's station, means controlled by the semaphore so operated by the way station operator for effecting the operation of said emergency signal at the despatcher's station, return signals for the respective semaphores at the despatcher's station, a main return signal circuit connecting all of said stations, and operative connections between said return signals and said return signal circuit whereby a predetermined return signal in the despatcher's office will be set when a semaphore is selected and set from the despatcher's station.

7. In a semaphore operating signaling system, a despatcher's station, a set of semaphore stations, electrically operated selecting and operating mechanism at said semaphore stations, said operating mechanism including means for moving the semaphore from out of any position it may be in to its opposite position when affected by an electrical impulse of the same character as that required to move it to the first named position, a selecting circuit connecting all of said stations, a selecting switch in said selecting circuit, an operating circuit also connecting all of said stations, all being arranged whereby the despatcher may select a predetermined semaphore and then operate the same, combined with a way station, means controlled by the way station operator for operating predetermined semaphores to move them independently of the despatcher, an emergency signal at the despatcher's station, a main return signal circuit including means controlled by the semaphore so operated by the way station operator for effecting the operation of said emergency signal at the despatcher's station, return signals for the respective semaphores at the despatcher's station, said main return signal circuit connecting all of said stations, operative connections between said return signals and said return signal circuit coöperating with said selecting switch whereby a predetermined return signal in the despatcher's office will be set when a semaphore is selected and set from the despatcher's station, and means for automatically cutting out said return signal as said semaphore operating circuit is closed to energize said semaphore operating mechanism to move said semaphore to its safety position.

8. In a semaphore operating and signaling system, a despatcher's station and a set of semaphore stations, a selecting mechanism and an operating mechanism at each semaphore station, said operating mechanism including means for moving the semaphore from out of any position it may be in to its opposite position when affected by an electrical impulse of the same character as that required to move it to the first named position, a main selecting circuit and a main operating circuit connecting all of said stations, a selecting switch at the despatcher's station connected with said selecting circuit to effect the operation of said selecting mechanism, sources of electric energy for said selecting and operating circuits, a means under control of the despatcher for making and breaking said main operating circuit to cause the operating mechanism of the selected semaphore to be actuated to move the semaphore to both its danger and safety positions as desired while said selecting switch remains in the one selected position.

9. In a semaphore operating and signaling system, a despatcher's station and a series of semaphore stations, a selecting mechanism and an operating mechanism at each semaphore station, said operating mechanism including means for moving the semaphore from out of any position it may be in to its opposite position when affected by an electrical impulse of the same character as that required to move it to the first named position, a main selecting circuit and a main operating circuit connecting all of said stations, a selecting switch at the despatcher's station connected with said selecting circuit to effect the operation of said selecting mechanism to bring a predetermined semaphore operating mechanism into operative connection with the operating circuit sources of electric energy for said selecting and operating circuits, a means under control of the despatcher for making and breaking said main operating circuit to cause the operating mechanism of the selected semaphore to be actuated to move the semaphore to both its danger or safety position while said selecting switch remains in the selected position, return signals at the despatcher's station, and a return signal actuating circuit operatively connecting said stations.

10. In a semaphore operating and signaling mechanism, a despatcher's switch-board, combined with a series of electrically operated semaphores, a selecting mechanism and an operating mechanism for said semaphores, said operating mechanism including means for moving the semaphore from out of any position it may be in to its opposite position when affected by an electrical impulse of the same character as that required to move it to the first named position, a selecting circuit common to all of said semaphore selecting mechanisms and to the despatcher's switch-board, a selecting switch for the dispatcher's switch-board and connected in said selecting circuit, said selecting circuit including a source of electric energy, an operating circuit common to all of said semaphore operating mechanisms and to said despatcher's switch-board, and a source of electric energy, all being arranged whereby the despatcher may first select a predetermined semaphore by moving the selecting switch to a predetermined position, and means for closing said operating circuit whereby the selected semaphore will move from out of any position it may be in to its opposite position when affected by an electrical impulse of the same character as that required to move it to the first named position, without disturbing the position of the selecting switch when once set, a return signal circuit from one or more of said semaphores to the despatcher's switch-board, means coöperating with said selected semaphore and said selecting switch for operating a predetermined selected return signal at the despatcher's switch-board corresponding to the selected semaphore to operate said selected signal when the semaphore is in one position.

11. In a semaphore operating and signaling mechanism, a despatcher's switch-board, combined with a series of electrically operated semaphores, a selecting mechanism and an operating mechanism for said semaphores, said operating mechanism including means for moving the semaphore from out of any position it may be in to its opposite position when affected by an electrical impulse of the same character as that required to move it to the first-named position, a selecting circuit common to all of said semaphore selecting mechanisms and to the despatcher's switch-board, a selecting switch for the despatcher's switch-board and connected in said selecting circuit, said selecting circuit including a source of electric energy, an operating circuit common to all of said semaphore operating mechanisms and to said despatcher's switch-board, and a source of electric energy, all being arranged whereby the despatcher may first select a predetermined semaphore by moving the selecting switch to a predetermined position, and means for closing said operating circuit whereby the selected semaphore will move from out of any position it may be in to its opposite position when affected by an electrical impulse of the same character as that required to move it to the first named position, without disturbing the position of the selecting switch when once set, a return signal circuit from one or more of said semaphores to the despatcher's switch-board, means coöperating with said selected semaphore and said selecting switch for operating a predetermined selected return signal at the despatcher's switch-board corresponding to the selected semaphore to operate said selected signal when the semaphore is in one position, and means controlled by the closing of the operating circuit when said circuit is closed to effect the restoration of the semaphore to its safety position for cutting out said selected signal at the despatcher's switch-board.

12. In a semaphore operating and signaling mechanism, a despatcher's switch-board, combined with a series of electrically operated semaphores, a selecting mechanism and an operating mechanism for said semaphores, said operating mechanism including means for moving the semaphore from out of any position it may be in to its opposite position when affected by an electrical impulse of the same character as that required to move it to the first named position, a selecting circuit common to all of said semaphore selecting mechanisms and to the despatcher's switch-board, a selecting switch for the despatcher's switch-board and connected in said selecting circuit, said selecting circuit including a source of electric energy, an operating circuit common to all of said semaphore operating mechanisms and to said despatcher's switch-board, and a source of electric energy, all being arranged whereby the despatcher may first select a predetermined semaphore by moving the selecting switch to a predetermined position, and means for closing said operating circuit whereby the selected semaphore will move from out of any position is may be in to its opposite position when affected by an electrical impulse of the same character as that required to move it to the first named position, without disturbing the position of the selecting switch when once set, a return signal circuit from one or more of said semaphores to the despatcher's switch-board, means coöperating with said selected semaphore and said selecting switch for operating a predetermined selected return signal at the despatcher's switch-board corresponding to the selected semaphore to operate said selected signal when the semaphore is in one position, and means controlled by the closing of the operating circuit when said circuit is closed to effect the restoration of the semaphore to its safety position for cutting out said selected signal at the despatcher's switch-board, together with a way station switch board, means controlled by the way station semaphore mechanism for signaling the way station operator, and a connection between the way station and the semaphore mechanism at each side of the way station whereby the way station operator may operate said semaphores at each side of the station to throw the same independently of the despatcher's switch board.

13. In a semaphore operating and signaling mechanism, a despatcher's switch-board, combined with a series of electrically operated semaphores, a selecting mechanism and an operating mechanism for said semaphores, said operating mechanism including means for moving the semaphore from out of any position it may be in to its opposite position when affected by an electrical impulse of the same character as that required to move it to the first named position, a selecting circuit common to all of said semaphore selecting mechanisms and to the despatcher's switch-board, a selecting switch for the despatcher's switch-board and connected in said selecting circuit, said selecting circuit including a source of electric energy, an operating circuit common to all of said semaphore operating mechanisms and to said despatcher's switch-board, and a source of electric energy, all being arranged whereby the despatcher may first select a predetermined semaphore by moving the selecting switch to a predetermined position, and means for closing said operating circuit whereby the selected semaphore will move from out of any position it may be in to its opposite position when affected by an electrical impulse of the same character as that required to move it to the first named position, without disturbing the position of the selecting switch when once set, a return signal circuit from one or more of said semaphores to the despatcher's switch-board, means coöperating with said selected semaphore and said selecting switch for operating a predetermined selected return signal at the despatcher's switch-board corresponding to the selected semaphore to operate said selected signal when the semaphore is in one position, and means controlled by the closing of the operating circuit when said circuit is closed to effect the restoration of the semaphore to its safety position for cutting out said selected signal at the despatcher's switch-board, together with a way station switch board, means controlled by the way station semaphore for effecting a signaling act in the way station, and a connection between the way station and the semaphore mechanisms at each side of the station's semaphore mechanism whereby the way station operator may throw said semaphores at each side independently of the despatcher's switch-board, and means for operating an independent signal at the despatcher's switch-board when the way station operator operates a semaphore.

14. In a semaphore-operating and signaling mechanism, a despatcher's switch-board combined with a series of electrically operative semaphores, semaphore selecting and operating mechanism for each semaphore, said operating mechanism including means for moving the semaphore from out of any position it may be in to its opposite position when affected by an electrical impulse of the same character as that required to move it to the first named position, a selecting circuit common to all of said semaphore selecting mechanisms and to the despatcher's switch-board, a selecting switch at the despatcher's switch-board and connected in said selecting circuit, said selecting circuit including a source of electric energy; combined with a main operating circuit common to all of said semaphore operating mechanisms and said despatcher's switch-board, a source of electric energy in said main operating circuit, means for closing said main operating circuit, all being arranged whereby the despatcher may first select a predetermined semaphore by moving the selecting switch to a predetermined position, and then by closing said main operating circuit may cause said predetermined semaphore to move from out of the position it may be in to its opposite position, without disturbing the position of the selecting switch when once set, a return signal circuit from one or more of said semaphores to the despatcher's switch-board, return signals in said return signal circuit, means coöperating with said selected semaphore and said selecting switch for operating a predetermined selected signal at the despatcher's switch-board corresponding to the selected semaphore and operate said selected signal as the semaphore moves from its safety to its danger position, means controlled by the operation of said main operating circuit, when said main operating circuit is energized to restore said semaphore to its safety position, for disconnecting said selected signal at the despatcher's switch-board, a way station electrically connected with one of said semaphores, and means controlled by said last named semaphore when operated for setting a call signal in the way station.

15. In a semaphore-operating and signaling mechanism, a despatcher's switch-board combined with a series of electrically operative semaphores, semaphore selecting and operating mechanism for each semaphore, said operating mechanism including means for moving the semaphore from out of any position it may be in to its opposite position when affected by an electrical impulse of the same character as that required to move it to the first named position, a selecting circuit common to all of said semaphore selecting mechanisms and to the despatcher's switch-board, a selecting switch at the despatcher's switch-board and connected in said selecting circuit, said selecting circuit including a source of electric energy; combined with a main operating circuit common to all of said semaphore operating mechanisms and said despatcher's switch-board, a source of electric energy in said main operating circuit, means for closing said main operating circuit, all being arranged whereby the despatcher may first select a predetermined semaphore by moving the selecting switch to a predetermined position, and then by closing said main operating circuit may cause said predetermined semaphore to move from out of the position it may be in to its opposite position, without disturbing the position of the selecting switch when once set, a return signal circuit from one or more of said semaphores to the despatcher's switch-board, return signals in said return signal circuit, means coöperating with said selected semaphore and said selecting switch for operating a predetermined selected signal at the despatcher's switch-board corresponding to the selected semaphore and operate said selected signal as the semaphore moves from its safety to its danger position, means controlled by the operation of said main operating circuit, when said main operating circuit is energized to restore said semaphore to its safety position, for disconnecting said selected signal at the despatcher's switch-board, and a way station electrically connected with one of said semaphores, and means controlled by said last named semaphore when operated for setting a call signal in the way station, and means in the way station for cutting out said call signal.

16. In a semaphore operating and signaling mechanism, a despatcher's switch-board combined with a series of electrically operated semaphores, a selecting mechanism and an operating mechanism for each semaphore, said operating mechanism including means for moving the semaphore from out of any position it may be in to its opposite position when affected by an electrical impulse of the same character as that required to move it to the first named position, a selecting circuit common to all of said semaphore selecting mechanism and to the despatcher's switch-board, a selecting switch for the despatcher's switch-board, and connected in said selecting circuit, said selecting circuit including a source of electric energy; combined with a main operating circuit common to all of said semaphores and said despatcher's switchboard, and a source of electric energy, means for closing said main operating circuit, all being arranged whereby the despatcher may first select a predetermined semaphore by moving the selected switch to a predetermined position and then close said main operating circuit so that said predetermined semaphore will move from out of any position it may be in to the opposite position when affected by an electrical impulse of the same character as that required to move it to the first named position, a return signal circuit from one or more of said semaphores to the despatcher's switch-board, return signals at said switch-board, means coöperating with said selected semaphore and said selecting switch for operating a predetermined selected signal at the despatcher's switch-board corresponding to the selected semaphore to operate said selected signal when the semaphore is in one position, means controlled by the operation of said main operating circuit when closed to effect the movement of the semaphore to its safety position, for disconnecting said selected signal at the despatcher's switch-board, together with a way-station switch-board, means connecting predetermined semaphores with said way-station switch-board whereby the way-station operator may operate said predetermined semaphores to move them to one position independently of the despatcher's switch-board, and a signaling circuit connecting another semaphore with said way-station, and means in said last named signaling circuit whereby when said last named circuit is operated, a call signal will be set in the way station.

17. In a semaphore operating and signaling mechanism, a despatcher's switch-board combined with a series of electrically operated semaphores, a selecting mechanism and an operating mechanism for each semaphore, said operating mechanism including means for moving the semaphore from out of any position it may be in to its opposite position when affected by an electrical impulse of the same character as that required to move it to the first named position, a selecting circuit common to all of said semaphore selecting mechanism and to the despatcher's switch-board, a selecting switch for the despatcher's switch-board, and connected in said selecting circuit, said selecting circuit including a source of electric energy; combined with a main operating circuit common to all of said semaphores and said despatcher's switch-board, and a source of electric energy, means for closing said main operating circuit, all being arranged whereby the despatcher may first select a predetermined semaphore by moving the selected switch to a predetermined position and then close said main operating circuit so that said predetermined semaphore will move from out of any position it may be in to the opposite position when affected by an electrical impulse of the same character as that required to move it to the first named position, a return signal circuit from one or more of said semaphores to the despatcher's switch-board, return signals at said switch-board, means coöperating with said selected semaphore, and said selecting switch for operating a predetermined selected signal at the despatcher's switch-board corresponding to the selected semaphore to operate said selected signal when the semaphore is in one position, means, operative upon closing the main operating circuit to effect the restoration of the semaphore to its safety position, for extinguishing said selected signal at the despatcher's switch-board, together with a way-station switch-board, means connecting predetermined semaphores with said way-station switch-board whereby the way-station operator may operate said predetermined semaphores to move them to one position independently of the despatcher's switch-board, a signaling circuit connecting another semaphore with said way-station, means in said last named signaling circuit whereby when said last named circuit is operated a call signal will be set in the way station, and means at the way-station for cutting out said call signal.

18. In a system of the class described, a series of semaphore mechanisms, a positive and a negative relay one of each for each semaphore mechanism, the positive and negative relays of each semaphore mechanism being electrically connected with one another, and line wires connecting the positive and negative relays of all of said semaphore mechanisms together, a despatcher's switch-board electrically connected to said line wires, a selecting mechanism in each of said semaphore mechanisms and operatively connected with one of said semaphore relays whereby when said semaphore relay is energized the selecting mechanism will be operated to select a predetermined semaphore, said selecting mechanisms each including a circuit closing means electrically connected with the other relay and with a local operating circuit, said local operating circuit of each semaphore including a drive motor and a source of electric energy, said semaphore having a rotatable shaft carrying the semaphore blade and geared with said drive motor, means at the despatcher's office and coöperatively connected with said line wires for operating all of said positive relays to operate all of said selecting mechanisms simultaneously, the circuit closing means of each selecting mechanism being arranged to close at different times whereby but one will be closed at a time, and other means at the despatcher's station and connected with said line wires for operating the negative relays of said semaphores to close the circuit controlled thereby to cause the drive motor circuit of the selected semaphore to become completely closed and operate said semaphore.

19. In a system of the class described, a plurality of semaphore stations and a despatcher's station; each of said semaphore stations including a step-by-step selecting mechanism and a semaphore operating mechanism controlled thereby, said operating mechanism including means for moving the semaphore out of any position it may be in to its opposite position when affected by successive electrical impulses of the same character, combined with a main selecting and main operating circuits including a pair of common line wires common to said selecting mechanisms and said operating mechanisms, means at the despatcher's station and coöperating with said selecting circuit for energizing the same and effecting the selection of a predetermined semaphore mechanism, means at the despatcher's station for energizing said main operating circuit to effect the operation of the selected semaphore to move it from either of its positions to the other, and means controlled by the operation of said semaphore mechanism for setting a predetermined signal at the despatcher's station.

20. In a system of the class described, a plurality of semaphore mechanisms and a despatcher's station, signals at the despatcher's station, line wires connecting said semaphores with said despatcher's station, each of said semaphore mechanisms including a step-by-step selecting mechanism, and a semaphore operating mechanism controlled thereby combined with means controlled at the despatcher's station for first selecting a predetermined semaphore and then causing such semaphore to be set into operation, means controlled by the operation of said semaphore for setting a predetermined one of said signals at the despatcher's station combined with a way-station switch-board and means connecting predetermined semaphores with said way-station switch-board whereby the way-station operator may set said predetermined semaphores, and means controlled by the semaphores so set for operating one of said signals in the despatcher's office.

21. In a system of the class described, a despatcher's station and a plurality of semaphore mechanisms together with line wires electrically connecting said semaphore mechanisms with said despatcher's station, each of said semaphore mechanisms having a positive and a negative relay electrically connected to said line wires, a selecting mechanism for each semaphore mechanism having an operating magnet and a circuit closer, the operating magnet in said selecting mechanism being electrically connected with one of said semaphore relays and the circuit closer of the selecting mechanism being electrically connected with the other relay, a local source of electric energy controlled by said positive and negative relays, an operating motor for each semaphore operatively connected with the circuit closer of the selecting mechanism, a local source of electric energy for said motor, the circuit closers of the selecting mechanism of each semaphore being differently set so that but a predetermined semaphore is brought into circuit at a time, and means at the despatcher's station for energizing all of said first mentioned relays to operate all of said selecting mechanism step by step to bring a predetermined semaphore with its selecting mechanism circuit closer into operative position, and means at the despatcher's station for energizing the other relays to operate the motor circuit of the selected semaphore to move said semaphore into an indicating position.

22. In a system of the class described, despatcher's station and a plurality of semaphore mechanisms together with line wires electrically connecting said semaphore mechanisms with said despatcher's station, each of said semaphore mechanisms having a positive and a negative relay electrically connected to said line wires, a selecting mechanism for each semaphore mechanism having an operating magnet and a circuit closer, the operating magnet in said selecting mechanism being electrically connected with one of said semaphore relays and the circuit closer of the selecting mechanism being electrically connected with the other relay, a local source of electric energy for said positive and negative relays, an operating motor for each semaphore mechanism operatively connected with the circuit closer of the selecting mechanism, a local source of electric energy for said motor, the circuit closers of the respective selecting mechanisms being differently set so that but a predetermined semaphore is brought into circuit at a time, and means at the despatcher's station for energizing all of said first mentioned relays to operate all of said selecting mechanisms step-by-step to bring a predetermined semaphore with its selecting mechanism circuit closer into operative position, means at the despatcher's station for energizing the other relays to operate the motor circuit of the selected semaphore to bring said semaphore into an indicating position, and a signaling circuit common to all of said semaphores and to the despatcher's station, said signaling circuit including a series of signals at the despatcher's station, one for each semaphore, and means at the despatcher's station and coöperating with said signaling circuit for operating a predetermined one of said signals corresponding to that of the set semaphore.

23. In a system of the class described, a despatcher's station and a plurality of semaphore mechanisms together with line wires electrically connecting said semaphore mechanisms with said despatcher's station, each of said semaphore mechanisms having a positive and a negative relay electrically connected to said line wires, a selecting mechanism for each semaphore mechanism having an operating magnet and a circuit closer, the operating magnet of said selecting mechanism being electrically connected with one of said semaphore relays and the circuit closer of the selecting mechanism being electrically connected with the other relay, a local source of electric energy controlled by said positive and negative relays, an operating motor for each semaphore mechanism coöperatively connected with the circuit closer of the selecting mechanism, a local source of electric energy for said motor, the circuit closers of the respective selecting semaphore mechanism being differently set so that but a predetermined semaphore is brought into circuit at a time, means at the despatcher's station for energizing all of said first mentioned relays to operate all of said selecting mechanisms step-by-step to bring a predetermined semaphore with its selecting mechanism circuit closer into operative position, means at the despatcher's station for energizing the other relays to operate the motor circuit of the selected semaphore to bring said semaphore into an indicating position, a signaling circuit common to all of said semaphores and to the despatcher's station, said signaling circuit including a series of signals in the despatcher's station, one for each semaphore, means at the despatcher's station and coöperating with said signaling circuit for operating a predetermined one of said signals corresponding with that of the set semaphore, and means at the despatcher's station for automatically cutting out said signal to remain cut out when the semaphore is in its safety position.

24. In a system of the class described, a despatcher's station and a plurality of semaphore mechanisms together with line wires electrically connecting said semaphore mechanisms with said despatcher's station, each of said semaphore mechanisms having a positive and a negative relay electrically connected to said line wires, a selecting mechanism for each semaphore mechanism having an operating magnet and a circuit closer, the operating magnet in said selecting mechanism being electrically connected with one of said semaphore relays and the circuit closer of the selecting mechanism being electrically connected with the other relay, a local source of electric energy controlled by said positive and negative relays, an operating motor for each semaphore mechanism operatively connected with the circuit closer of the selecting mechanism, a local source of electric energy for said motor, the circuit closers of the respective selecting mechanisms being differently set, so that but a predetermined semaphore is brought into circuit at a time, means at the despatcher's station for energizing all of said first mentioned relays to operate all of said selecting mechanisms step-by-step to bring a predetermined semaphore with its selecting mechanism circuit closer into operative position, means at the despatcher's station for energizing the other relays, to operate the motor circuit of the selected semaphore to bring said semaphore into an indicating position, a despatcher's selecting switch at the despatcher's station, a positive source of electric energy electrically connected with said switch and with one of said line wires, and said despatcher's switch being electrically connected to the other line wires, a switch in said connection between the positive source of energy and the despatcher's switch all being arranged whereby when the switch is closed and the despatcher's selecting switch operated the positive relays of all semaphore mechanisms will be operated to select a predetermined semaphore.

25. In a system of the class described, a despatcher's station, and a plurality of semaphore mechanisms together with line wires electrically connecting said semaphore mechanisms with said despatcher's station, each of said semaphore mechanisms having a positive and negative relay electrically connected to said line wires, a selecting mechanism for each semaphore mechanism, and including an operating magnet and a circuit closer, the operating magnet in said selecting mechanism being electrically connected with one of said semaphore relays, and the circuit closer of the selecting mechanism being electrically connected with the other relay, a local source of electric energy controlled by said positive and negative relays, an operating motor for each semaphore mechanism operatively connected with the circuit closer of the selected mechanism, a local source of electric energy for said motor, the circuit closers of the respective selecting mechanisms, of the respective semaphore mechanisms, being differently set so that but a predetermined semaphore is brought into circuit at a time, means at the despatcher's station for energizing all of said first mentioned relays to operate all of said selecting mechanisms step by step to bring a predetermined semaphore selecting mechanism circuit closer into operative position, means at the despatcher's station for energizing the other relays to operate the motor circuit of the selected semaphore and thereby bring said semaphore into an indicating position, said first mentioned means at the despatcher's station including a selecting switch and a positive source of electric energy, said positive source of electric energy being connected with said switch and one of said line wires, said switch being electrically connected to the other line wire, and also including a closing switch in said connection between the positive source of energy and the selecting switch, all being arranged whereby when said closing switch is closed and the selecting switch operating the positive relays of all semaphore mechanisms will be operated to select a predetermined semaphore, said second mentioned means at the despatcher's station including a negative source of electric energy connected with two of said line wires, said second mentioned means at the despatcher's station also including a circuit closer whereby when the circuit from the negative source of energy is closed, the negative relays of all semaphore mechanisms will be energized and operate the particular semaphore selected.

26. In a system of the class described, a despatcher's station, and a plurality of semaphore mechanisms together with line wires electrically connecting said semaphore mechanisms with said despatcher's station, each of said semaphore mechanisms having a positive and negative relay electrically connected to said line wires, a selecting mechanism for each semaphore mechanism, and including an operating magnet and a circuit closer, the operating magnet in said selecting mechanism being electrically connected with one of said semaphore relays, and the circuit closer of the selecting mechanism being electrically connected with the other relay, a local source of electric energy controlled by said positive and negative relays, an operating motor for each semaphore mechanism operatively connected with the circuit closer of the selected mechanism, a local source of electric energy for said motor, the circuit closers of the respective selecting mechanisms, of the respective semaphore mechanisms, being differently set so that but a predetermined semaphore is brought into circuit at a time, means at the despatcher's station for energizing all of said first mentioned relays to operate all of said selecting mechanisms step by step to bring a predetermined semaphore selecting mechanism circuit closer into operative position, means at the despatcher's station for energizing the other relays to operate the motor circuit of the selected semaphore and thereby bring said semaphore into an indicating position, said first mentioned means at the despatcher's station including a selecting switch and a positive source of electric energy, said positive source of electric energy being connected with said switch and one of said line wires, said switch being electrically connected to the other line wire, and also including a closing switch in said connection between the positive source of energy and the selecting switch, all being arranged whereby when said closing switch is closed and the selecting switch operating the positive relays of all semaphore mechanisms will be operated to select a predetermined semaphore, said second mentioned means at the despatcher's station including a negative source of electric energy connected with said line wires, said second mentioned means at the despatcher's station also including a circuit closer whereby when the circuit from the negative source of energy is closed, the negative relays of all semaphore mechanisms will be energized and operate the particular semaphore selected, and a return signal circuit common to all of said semaphore mechanisms and to the despatcher's office, a series of signals, one for each semaphore mechanism, and a corresponding series of signal operating mechanisms, one for each signal, said signal operating mechanisms having operating magnets electrically connected with said selecting switch and coöperatively connected with said signaling circuit and with a local source of electric energy whereby when a semaphore is moved to its set position one of said signal operating mechanisms will be operated to operate its particular signal.

27. In a system of the class described, a despatcher's station, and a plurality of semaphore mechanisms together with line wires electrically connecting said semaphore mechanisms with said despatcher's station, each of said semaphore mechanisms having a positive and negative relay electrically connected to said line wires, a selecting mechanism for each semaphore mechanism and including an operating magnet and a circuit closer, the operating magnet in said selecting mechanism being electrically connected with one of said semaphore relays, and the circuit closer of the selecting mechanism being electrically connected with the other relay, a local source of electric energy controlled by said positive and negative relays, an operating motor for each semaphore mechanism operatively connected with the circuit closer of the selected mechanism, a local source of electric energy for said motor, the circuit closers of the respective selecting mechanisms, of the respective semaphore mechanisms being differently set so that but a predetermined semaphore is brought into circuit at a time, means at the dispatcher's station for energizing all of said first mentioned relays to operate all of said selecting mechanisms step by step to bring a predetermined semaphore selecting mechanism circuit closer into operative position, means at the despatcher's station for energizing the other relays to operate the motor circuit of the selected semaphore and thereby bring said semaphore into an indicating position, said first mentioned means at the despatcher's station including a selecting switch and a positive source of electric energy, said positive source of electric energy being connected with said switch and one of said line wires, said switch being electrically connected to the other line wire, and also including a closing switch in said connection between the positive source of energy and the selecting switch, all being arranged whereby when said closing switch is closed and the selecting switch operating the positive relays of all semaphore mechanisms will be operated to select a predetermined semaphore, said second mentioned means at the despatcher's station including a negative source of electric energy connected with two of said line wires, said second mentioned means at the despatcher's station also including a circuit closer whereby when the circuit from the negative source of energy is closed, the negative relays of all semaphore mechanisms will be energized and operate the particular semaphore selected, and a return signal circuit common to all of said semaphore mechanisms and to the despatcher's office, a series of signals, one for each semaphore mechanism, and a corresponding series of signal operating mechanisms, one for each signal, said signal operating mechanisms having operating magnets electrically connected with said selecting switch and coöperatively connected with said signaling circuit and with a local source of electric energy whereby when a semaphore is moved to its set position one of said signal operating mechanisms will be operated to operate its particular signal, and means controlled at the despatcher's office for disconnecting said signal upon operation of the main operating circuit when energized to move the semaphore to its original position.

28. In a system of the class described, a despatcher's station, and a plurality of semaphore mechanisms together with line wires electrically connecting said semaphore mechanisms with said despatcher's station, each of said semaphore mechanisms having a positive and negative relay electrically connected to said line wires, a selecting mechanism for each semaphore mechanism, and including an operating magnet and a circuit closer, the operating magnet in said selecting mechanism being electrically connected with one of said semaphore relays, and the circuit closer of the selecting mechanism being electrically connected with the other relay, a local source of electric energy controlled by said positive and negative relays, an operating motor for each semaphore mechanism operatively connected with the circuit closer of the selected mechanism, a local source of electric energy for said motor, the circuit closers of the respective selecting mechanisms, of the respective semaphore mechanisms, being differently set so that but a predetermined semaphore is brought into circuit at a time, means at the despatcher's station for energizing all of said first mentioned relays to operate all of said selecting mechanisms step by step to bring a predetermined semaphore selecting mechanism circuit closer into operative position, means at the despatcher's station for energizing the other relays to operate the motor circuit of the selected semaphore and thereby bring said semaphore into an indicating position, said first mentioned means at the despatcher's station including a selecting switch and a positive source of electric energy, said positive source of electric energy being connected with said switch and one of said line wires, said switch being electrically connected to the other line wire, and also including a closing switch in said connection between the positive source of energy and the selecting switch, all being arranged whereby when said closing switch is closed and the selecting switch operating the positive relays of all semaphore mechanisms will be operated to select a predetermined semaphore, said second mentioned means at the despatcher's station including a negative source of electric energy connected with two of said line wires, said second mentioned means at the despatcher's station also including a circuit closer whereby when the circuit from the negative source of energy is closed, the negative relays of all semaphore mechanisms will be energized and operate the particular semaphore selected, and a return signal circuit common to all of said semaphore mechanisms and to the despatcher's office, a series of signals, one for each semaphore mechanisms, and a corresponding series of signal operating mechanisms, one for each signal, said signal operating mechanisms having operating magnets electrically connected with said selecting switch and coöperatively connected with said signaling circuit and with a local source of electric energy whereby when a semaphore is moved to its set position one of said signal operating mechanisms will be operated to operate its particular signal, and means controlled at the despatcher's office for disconnecting said signal upon operation of the main operating circuit when energized to move the semaphore to its original position, said last named means comprising a releasing mechanism for each signal operating mechanism, said releasing mechanism including a releasing magnet operatively connected with said negative relay for effecting the disconnection of said signal.

29. In a system of the class described, a despatcher's station and a plurality of semaphore mechanism together with line wires, electrically connecting said semaphore mechanisms with said despatcher's station, each of said semaphore mechanisms having a positive and a negative relay electrically connected to said line wires, a selecting mechanism for each semaphore mechanism having an operating magnet, and a circuit closer, the operating magnet in each selecting mechanism being electrically connected with one of said semaphore relays and the circuit closer of the selecting mechanism being electrically connected with the other relay, a local source of electric energy controlled by said positive and negative relays, an operating motor for each semaphore mechanism operatively connected with the circuit closer of the selecting mechanism, a local source of electric energy for said motor, the circuit closers of the selecting mechanisms for each semaphore mechanism being differently set so that but a predetermined semaphore mechanism is brought into circuit at a time, means at the despatcher's station for energizing all of said first mentioned relays to operate all of said selecting mechanisms step-by-step to bring a predetermined semaphore with its selecting mechanism circuit closer into operative position, means at the despatcher's station for energizing the other relays to operate the motor circuit of the selected semaphore to bring said semaphore into an indicating position, said first mentioned means at the despatcher's station including a universal selecting switch and a positive source of electric energy electrically connected with said switch and with one of said line wires, said universal switch being electrically connected to the other line wire, a switch in said connection being between the positive and negative source of energy and the universal switch, all being arranged whereby when the switch is closed and the universal selecting switch operated the positive relays of all semaphore mechanisms will be operated to select a predetermined semaphore, said second mentioned means at the despatcher's station including a negative source of electric energy connected with one of said line wires and with the other line wire, and a circuit closer whereby when the circuit is closed the negative relays of all semaphore mechanisms will be energized and operate the particular semaphore selected, and a return signal circuit common to all of said semaphore mechanisms and to said despatcher's office, a series of signals one for each semaphore and a corresponding series of signal operating mechanisms one for each signal, said signal operating mechanism having operating magnets electrically connected with said universal switch and cooperatively connected with said signaling circuit and with a local source of electric energy whereby when a semaphore is set a predetermined one of said signal operating mechanisms will be operated to operate its particular signal, means controlled at the despatcher's office for disconnecting said signal separate means independent of the despatcher's office for setting predetermined semaphores, means controlled by the movement of one semaphore for bringing said separate means into operative connection, a call signal in the despatcher's office, and means controlled by the predetermined semaphore so set for operating said call signal.

30. In a railway signaling system, a signal sending station, a plurality of signal controlling devices distributed along a railroad right of way, said signal controlling devices including selecting mechanism, and operating mechanism for moving the signal from out of any position it may be in to its opposite position when affected by successive electrical impulses of the same character, switching mechanism at the signal sending station and current supplying means for furnishing direct currents of different polarity for selectively operating said signal controlling devices, signals under the control of said signal controlling devices, and switching means whereby an operative impulse of the signal controlling devices will manipulate the signal in one direction and a succeeding operative impulse will manipulate the signal in a different manner.

31. In a railway signaling system, a signal sending station, a plurality of signal controlling devices distributed along a railroad right of way, said signal controlling devices each including a selecting mechanism and an operating mechanism, said operating mechanism including means for moving the signal from out of any position it may be in to its opposite position when affected by an electrical impulse of the same character as that required to move it to the first named position, switching mechanism at the signal sending station, and current supplying means for furnishing direct currents of different polarity, signals under the control of said controlling devices, and switching means whereby an operative impulse of the signal controlling devices will manipulate the signal in one direction, and a succeeding operative impulse will manipulate the signal in a different direction, substantially as shown and described.

32. In a system of the class described, a plurality of semaphore stations, a despatcher's station, a main selecting circuit connecting all of said stations, a main operating circuit connecting all of said stations, said circuits including a pair of common line wires, a source of electric energy for each circuit, a selecting switch at the despatcher's station in said selecting circuit, a local selecting circuit at each semaphore station, electrically operative mechanism connecting said main selecting circuit with said local selecting circuits and including circuit makers, selecting mechanism in each of said local selecting circuits, a make and break circuit closer at the despatcher's station in said selecting circuit, a make and break closer at the despatcher's station in said operating circuit, semaphore operating mechanism at each semaphore station, means in said main operating circuit at each semaphore station and coöperatively connected with said semaphore operating mechanism and with said circuit makers, for effecting the operation of the selected semaphore.

33. In a system of the class described, a plurality of semaphore stations, a despatcher's station, a main selecting circuit connecting all of said stations, a main operating circuit connecting all of said stations, said circuits including a pair of common line wires, a source of electrical energy for each circuit, a selecting switch at the despatcher's station in said selecting circuit, a local selecting circuit at each semaphore station, electrically operative mechanism connecting said main selecting circuit with said local selecting circuits, selecting mechanism in each of said local selecting circuits and including circuit makers, a make and break circuit closer at the despatcher's station in said selecting circuit, a make and break closure at the despatcher's station in said operating circuit, semaphore operating mechanism at each semaphore station, means in said main operating circuit at each semaphore station and coöperatively connected with said semaphore operating mechanism and with said circuit maker for effecting operation of the selected semaphore, a return signal circuit connecting said stations, return signals for each semaphore station at the despatcher's station controlled by said return signal circuit and means governed by the movement of a selected semaphore for closing said return signal circuit, and coöperative means between said return signal circuit and said return signals for effecting the operation of the respective return signal at the despatcher's station when the return signal circuit is closed.

34. In a system of the class described, a plurality of semaphore stations each including selecting and operating mechanism, a despatcher's station, circuit connections between said despatcher's station and said semaphore stations, means at said despatcher's station for energizing said circuit connections to selectively set said semaphores, a way station, electrical circuit connections between said way station and predetermined semaphore stations, means at said way station for energizing said circuit connections to effect the operation of said predetermined semaphores independently of the despatcher's station.

35. In a system of the class described, a plurality of semaphore stations each including selecting and operating mechanism, a despatcher's station, circuit connections between said despatcher's station and said semaphore stations, means at said despatcher's station for energizing said circuit connections to selectively set said semaphores, a way station, electrical circuit connections between said way station and predetermined semaphore stations, means at said way station for energizing said circuit connections to effect the operation of said predetermined semaphores, return signals at the despatcher's station for each semaphore station, means governed by the movement of the selected semaphore for setting a selected return signal at the despatcher's station, an emergency signal at the despatcher's station, and means for operating said emergency signal when the way station operator throws a semaphore from such way station.

36. In a system of the class described, a despatcher's station, a plurality of semaphore stations, and a way station, electric circuit connections between all of said stations, selecting and operating mechanism at each semaphore station, a selecting switch at the despatcher's station for selecting a predetermined semaphore, a make and break circuit switch at the despatcher's station for controlling the operation of the selected semaphore, a way station signal, means under control of one of said semaphores for setting said way station signal, connections between said way station and some of said semaphore stations, means at said way station for controlling said connections to throw the semaphores at the last named stations independently of the despatcher's station.

37. In a system of the class described, a despatcher's station, a plurality of semaphore stations, and a way station, electric circuit connections between all of said stations, selecting and operating mechanism at each semaphore station, a selecting switch at the despatcher's station for selecting a predetermined semaphore, a make and break circuit switch at the despatcher's station for controlling the operation of the selected semaphore, a way station signal, means under control of one of said semaphores for setting said way station signal, means at said way station for controlling the connections between the way station and some of the semaphore stations to throw the semaphores at the last named stations independently of the despatcher's station, return signals at the despatcher's station, and means at the semaphore stations for controlling said return signals.

38. In a system of the class described, a despatcher's station, a plurality of semaphore stations and a way station, electric circuit connections between all of said stations, selecting and operating mechanism at each semaphore station, a selecting switch at the despatcher's station for selecting a predetermined semaphore, a make and break circuit switch at the despatcher's station for controlling the operation of the selected semaphore, a way station signal, means under control of one of said semaphores for setting said way station signal, means at said way station for throwing some semaphores independently of the despatcher's station, return signals at the despatcher's station, means at the semaphore stations for controlling said return signals, an emergency signal at the despatcher's station, said emergency signal coöperating with the return signal controlling means of the semaphores in virtue of which when a semaphore has been "thrown" by the way station operator, said emergency signal will be set.

39. In a system of the class described, a despatcher's station, a plurality of semaphore stations, a pair of line wires connecting all of said stations, a positive relay and a negative relay at each semaphore station connected in circuit with said line wires, a positive source of electric energy and a negative source of electric energy at said despatcher's station, each of said sources of electric energy having a common connection with one of said line wires and separate connections with the other line wire at the despatcher's station, a selecting switch in circuit with one of said sources of electric energy, a make and break circuit closer in circuit with the other source of electric energy, an electrically controlled semaphore operating mechanism at each semaphore station and an electrically controlled selecting device at each semaphore station, said semaphore operating mechanism including means for moving the semaphore from out of any position it may be into its opposite position when affected by an electric impulse of the same character as that required to move it to the first position, electro-operative connections between said positive relay and said selecting device to operate the same, said selecting devices each including a circuit closer, electrical connections between said negative relays and the circuit closers of the respective selecting devices, electrical connections between said semaphore operating mechanism of a station and the circuit closer, and negative relay in that station, all being arranged whereby the despatcher may send a selecting current through said line wires to actuate said positive relays to move said selecting devices of the semaphore stations to bring a desired one with its circuit closer into operatiove position and whereby the despatcher may then cause a current to flow through said line wires to energize said negative relays and thereby cause the selected semaphore operating mechanism to come into operation to throw the selected semaphore from whatever position it may be in to the opposite position.

40. In a system of the class described, a despatcher's station, a plurality of semaphore stations, a pair of line wires connecting all of said stations, a positive relay and a negative relay at each semaphone station connected in circuit with said line wires, a positive source of electric energy and a negative source of electric energy at said despatcher's station, each of said sources of electric energy having a common connection with one of said line wires and separate connections with the other line wire at the despatcher's station, a selecting switch in circuit with one of said sources of electric energy, a make and break circuit closer in circuit with the other source of electric energy, an electrically controlled semaphore, operating mechanism at each semaphore station and an electrically controlled selecting device at each semaphore station, said semaphore operating mechanism including means for moving the semaphore from out of any position it may be in to its opposite position when affected by an electrical impulse of the same character as that required to move it to the first position, electro-operative connections between said positive relay and said selecting device to operate the same, said selecting devices each including a circuit closer, electrical connections between said negative relays and the circuit closers of the respective selecting devices, electrical connections between said semaphore operating mechanism of a station and the circuit closer, and negative relay in that station, all being arranged whereby the despatcher may send a selecting current through said line wires to actuate said positive relays to move said selecting devices of the semaphore stations to bring a desired one with its circuit closer into operative position and whereby the despatcher may then cause a current to flow through said line wires to energize said negative relays and thereby cause the selected semaphore operating mechanism to come into operation to throw the selected semaphore from whatever position it may be in to the opposite position return signals at the despatcher's station, return signal circuit closers at the several semaphore stations, electro-operative connections between said return signal circuit closers and the return signals of said despatcher's station whereby the selected semaphore will set a selected return signal at the despatcher's station, and means under control of the despatcher for disconnecting the return signal when a negative current is flowing through said line wires from the despatcher's station.

41. In a system of the class described, a despatcher's station, a plurality of semaphore stations, a pair of line wires connecting all of said stations, a positive relay and a negative relay at each semaphore station connected in circuit with said line wires, a positive source of electric energy and a negative source of electric energy at said despatcher's station, each of said sources of electric energy having a common connection with one of said line wires and separate connections with the other line wire at the despatcher's station, a selecting switch in circuit with one of said sources of electric energy, a make and break circuit closer in circuit with the other source of electric energy, an electrically controlled semaphore operating mechanism at each semaphore station and an electrically controlled selecting device at each semaphore station, said semaphore operating mechanism including means for moving the semaphore from out of any position it may be in to its opposite position when affected by an electrical impulse of the same character as that required to move it to the first position, electro-operative connections between said positive relay and said selecting device to operate the same, said selecting devices each including a circuit closer, electrical connections between said negative relays and the circuit closers of the respective selecting devices, electrical connections between said semaphore operating mechanism of a station and the circuit closer and negative relay in that station, all being arranged whereby the despatcher may send a selecting current through said line wires to actuate said positive relays to move said selecting devices of the semaphore stations to bring a desired one with its circuit closer into operative position and whereby the despatcher may then cause a current to flow through said line wires to energize said negative relays and thereby cause the selected semaphore operating mechanism to come into operation to throw the selected semaphore from whatever position it may be in to the opposite position, a way station, means under control of the way station operator for throwing predetermined semaphores to one position independently of the despatcher, and means for notifying the despatcher when a semaphore has been thrown by the way station operator.

JEAN F. WEBB, Jr.

Witnesses:
JAMES J. RAGAN,
J. F. MORRISON.